(12) United States Patent
Sheehan et al.

(10) Patent No.: US 7,220,923 B1
(45) Date of Patent: May 22, 2007

(54) CLIP-ON ELECTRICAL CONDUIT CONNECTOR

(75) Inventors: Robert K. Sheehan, Cincinnati, OH (US); Wayne E. Witsman, Jr., Bellevue, OH (US)

(73) Assignee: Internatioinal Metal Hose Company, Bellevue, OH (US)

( * ) Notice: Subject to any disclaimer, the term of this patent is extended or adjusted under 35 U.S.C. 154(b) by 0 days.

(21) Appl. No.: 11/480,006

(22) Filed: Jun. 30, 2006

(51) Int. Cl.
*H02G 3/18* (2006.01)

(52) U.S. Cl. .................. 174/668; 174/669; 174/660; 174/135; 248/56

(58) Field of Classification Search .............. 174/481, 174/503, 651, 653, 654, 655, 659, 660, 668, 174/669, 68.1, 480, 500, 50, 53, 57, 58, 650, 174/68.3, 135; 248/56; 16/2.1, 2.2; 439/98, 439/95, 96, 435
See application file for complete search history.

(56) References Cited

U.S. PATENT DOCUMENTS

| | | | | |
|---|---|---|---|---|
| 3,183,297 | A * | 5/1965 | Curtiss | 174/669 |
| 4,366,344 | A | 12/1982 | Sheehan | |
| 4,619,332 | A * | 10/1986 | Sheehan | 174/659 |
| 4,880,387 | A * | 11/1989 | Stikeleather et al. | 174/653 |
| 4,990,721 | A * | 2/1991 | Sheehan | 174/660 |
| 5,200,575 | A * | 4/1993 | Sheehan | 174/669 |
| 5,912,431 | A | 6/1999 | Sheehan | |
| 6,140,582 | A * | 10/2000 | Sheehan | 174/669 |
| 6,380,483 | B1 * | 4/2002 | Blake | 16/2.1 |
| 7,078,623 | B1 * | 7/2006 | Sheehan | 174/135 |

OTHER PUBLICATIONS

Arlington Industries, Inc., Snap Tite Connectors, Product Brochure, pp. 1-4, copyright 1996.
Regal Fittings, Electrical Cable & Conduit Fittings, Catalog, Apr. 2002, p. 16.
Bridgeport Fittings, Inc., Flexible Metal Conduit & Armored Cable Fittings, Catalog, www.bpfittings.com/catalog (accessed on Jun. 30, 2006).

\* cited by examiner

*Primary Examiner*—Angel R. Estrada
(74) *Attorney, Agent, or Firm*—Gallagher & Dawsey Co., LPA; David J Dawsey; Michael J Gallagher

(57) ABSTRACT

A clip-on electrical conduit connector is designed to clip onto conduit for connection to junction boxes. The connector incorporates a junction box engagement portion, a conduit engagement portion, and a conduit stop. The junction box engagement portion includes a pair of attachment prongs and a grip enhancing feature. The conduit engagement portion includes two sides formed with a base, a longitudinal locking projection, and a transverse locking feature. The longitudinal locking projection prevents the conduit from being unintentionally withdrawn from the conduit engagement portion. The transverse locking feature includes a transverse locking gap for preventing unintentional withdrawal of the conduit in a transverse direction from the conduit engagement portion. Prior to final installation, the conduit is forcibly inserted into the conduit engagement portion by squeezing the conduit through the transverse locking gap or by threading the conduit into the conduit engagement portion.

20 Claims, 15 Drawing Sheets

CLIP-ON ELECTRICAL CONDUIT CONNECTOR

TECHNICAL FIELD

The instant invention relates to fittings for connecting electrical conduit to junction boxes, outlet boxes, or other enclosures, and, more particularly, to an electrical conduit connector with a conduit engagement portion and a box engagement portion that quickly clips on conduit and subsequently releasably attaches to a junction box.

BACKGROUND OF THE INVENTION

The most common use for electrical conduit connectors is to facilitate the connection of conduit to a junction box. The junction box can be a variety of electrical enclosures such as an outlet box, transformer enclosure, circuit panel, lighting fixture—the list is nearly endless. There are many types of electrical conduit connectors. One type is used to make "snap-in," 90 degree connections to junction boxes. The snap-in connectors do not have a locknut. Thus, during final installation, the snap-in connectors allow the electrician to quickly complete installation. The snap-in connectors are snapped into a knockout by compressing a set of attachment prongs and forcing the prongs through the knockout. In turn, the prongs capture a junction box interior surface and hold the connector and conduit to a junction box exterior surface.

In many electrical installation projects it is common for an electrician to complete as much preassembly in an environment that is relatively comfortable, safe, and where most non-portable equipment and tools are located, prior to completing the final assembly. Sometimes the preassembly is completed in a workshop at the same facility as the final assembly, other times the preassembly is completed offsite by a contractor. The preassembly may include prewiring or assembly of many individual components. Once any preassembly is complete, the preassembled components are transported to the final installation location.

The preassemblies are generally referred to as "whips" or "fixture whips" and may be a combination of connectors, electrical wires, conduit, and other related components. At least one problem arises when the snap-in connector is used. Many times during transportation of the whips, the snap-in connectors separate from the conduit. At a minimum then, the electrician has to spend additional time to reattach the connector. In a worst case situation, the connector is lost, the connector having fallen off of the conduit during transport, and is not recovered. In this situation, the electrician would then have to find and install replacement connectors prior to the final installation. In either case, at a minimum, the time and cost savings realized by preassembling the whip is lost during transportation to the final installation location.

Another problem with existing snap-in connectors, referred to above, is that the connectors are difficult to install. In an effort to speed up the installation process, the electrician may use a tool to compress the connector to get the attachment prongs to fit into the knockout. Occasionally, however, the tool will slip from the connector potentially resulting in a painful hand injury.

Another limitation with the existing connectors is that they do not accept a variety of conduit diameters. Therefore, the electrician must keep a large inventory of connectors available for installation onto different conduit sizes. Those skilled in the art will attest that creating and maintaining a large inventory of different sized connectors is time consuming and costly.

By way of example, current art and widely used angle connectors are multi-component; i.e., having screws, body, cap, locknuts, or other components. They are relatively expensive to manufacture due to their many components which must be separately manufactured and then assembled, often negating any benefit of their being able to accommodate different diameter conduit. Using these multi-component connectors is labor intensive as there are multiple steps in inserting and securing the conduit. Contractors and others are oftentimes in difficult working environments such as on ladders, scaffolding, in cold weather, etc. Locknuts are dropped, cross threaded, and so on, making these assembly operations highly troublesome.

There remains an unfulfilled need to provide an electrical conduit connector which can be installed quickly and easily with or without tools, captures, or clips on, the conduit in a manner that prevents unintentional withdrawal of the conduit from the connector, and does not, therefore, fall off during normal handling such as during transport, and that cooperates with larger ranges of conduit sizes.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

A clip-on electrical conduit connector accepts and releasably captures, or clips on, a conduit. During final installation, the connector releasably connects to a junction box. The instant invention is equally successful in connecting a plurality of types of conduits, such as flexible metal conduit, armored cable, and metallic cable, to a wide variety of boxes. The conduit has a conduit exterior surface, a conduit leading edge, a helical groove between an overlap in the interlocking armor, and a helical groove repeat distance formed from one overlap to the next overlap in the interlocking armor. The conduit exterior surface has a conduit outside diameter. The helical groove has a helical groove outside diameter which may be smaller than the conduit outside diameter.

The junction box is one of many types of electrical enclosures. The junction box has a box interior surface and a box exterior surface. Typically, the junction box has a plurality of prefabricated holes each of which is covered with a plate or is formed with a thin area in the junction box, commonly called a knockout.

As one skilled in the art will observe and appreciate, by way of example and not limitation, the connector may be stamped from a unitary piece of metal or plastic. Alternatively, the connector may be cast, press formed, or injection molded as a single part, or the connector may be constructed from multiple parts. The individual parts may be soldered or welded together.

The connector has a body. The body has a distal end, a proximal end, a body interior surface, and a body exterior surface. The body also has a box engagement portion, a conduit engagement portion, and a central plane. The box engagement portion releasably connects the body to the junction box while the conduit engagement portion clips on the conduit. The conduit engagement portion may keep the conduit within the conduit engagement portion so that the conduit and the connector remain connected during transportation from one location to another. The central plane extends longitudinally through the box engagement portion and the conduit engagement portion and is oriented substantially perpendicular to the box exterior surface. Thus, the conduit engagement portion inhibits the unintentional separation of the conduit from the connector.

In one embodiment of the instant invention, the box engagement portion may have a box engagement portion primary end, a box engagement portion secondary end, a box engagement portion sinistral side, a box engagement portion dextral side, and a grip enhancing feature. The box engagement portion sinistral side and dextral side are joined to a box engagement portion base. The box engagement portion has a sinistral attachment prong and a dextral attachment prong. The sinistral and dextral attachment prongs may be inserted into the knockout to releasably attach the connector to the junction box.

The sinistral attachment prong may be located between the box engagement portion primary end and the box engagement portion secondary end. Similarly, the dextral attachment prong may be located between the box engagement portion primary end and the box engagement portion secondary end. In one embodiment of the connector, the box engagement portion may be substantially symmetrical across the central plane.

In another embodiment of the instant invention, the grip enhancing feature is located on the body exterior surface. The grip enhancing feature may be positioned in proximity to each of the sinistral and dextral attachment prongs. In this embodiment of the grip enhancing feature, the electrician may use a tool, possibly a pair of pliers, to place the grip enhancing feature in a pincer grip which may allow the electrician to more easily insert the sinistral and dextral attachment prongs into the knockout.

As previously mentioned, the conduit engagement portion may releasably clip on the conduit within the body while the assembly of the conduit, the connector, and any electrical conductors are transported from the assembly location to the installation location. In one embodiment of the instant invention, the conduit engagement portion has a conduit engagement portion leading edge, a conduit engagement portion secondary end, a conduit engagement portion sinistral side, a conduit engagement portion dextral side, a conduit engagement portion base, a longitudinal locking projection, and a transverse locking feature.

In one embodiment, the generally U-shaped connector may be formed with a generally U-shaped box engagement portion and a generally U-shaped conduit engagement portion. The generally U-shaped conduit engagement portion has conduit engagement portion sinistral side connected to the conduit engagement portion base. Similarly, the conduit engagement portion dextral side may be connected to the conduit engagement portion base. Thus, the sinistral and dextral sides together with the conduit engagement portion base form the U-shape conduit engagement portion. The conduit engagement portion has an interior surface with the conduit engagement portion sinistral side, the conduit engagement portion dextral side, and the conduit engagement portion base having a sinistral side interior surface, a dextral side interior surface, and a conduit engagement portion base interior surface, respectively.

The conduit engagement portion base may also have a central axis. The longitudinal locking projection may be located between the conduit engagement portion leading edge and the conduit engagement portion secondary end. The longitudinal locking projection may extend from the body interior surface toward the central axis.

In one embodiment of the instant invention, the transverse locking feature is on the body interior surface between the conduit engagement portion secondary end and the conduit engagement portion leading edge. The distance between the furthest projections of the transverse locking feature from the dextral side interior surface to the sinistral side interior surface is a transverse locking gap. As one skilled in the art will observe and appreciate, the transverse locking gap may be less than the conduit outside diameter to releasably capture the conduit in the conduit engagement portion.

In one embodiment of the instant invention, the central plane may help describe other portions of the body. The central plane may be positioned longitudinally through the box engagement portion and the conduit engagement portion, may be substantially perpendicular to the box exterior surface, and the central plane may be approximately equidistant between the box engagement portion sinistral side and the box engagement portion dextral side.

In one embodiment of the instant invention, the central axis may be coincident with the central plane, and the conduit engagement portion base interior surface may be defined by a radius and an arc angle. The arc angle extends from where the conduit engagement portion sinistral side meets the conduit engagement portion base to where the conduit engagement portion dextral side meets the conduit engagement portion base. In one embodiment, the arc angle is approximately 180 degrees.

In one embodiment of the instant invention, the conduit engagement portion may have a conduit engagement portion interior width. The conduit engagement portion interior width may be the shortest distance between the sinistral side interior surface and the dextral side interior surface.

In another embodiment of the instant invention, the transverse locking feature is a transverse locking projection. The transverse locking projection has a transverse locking projection apex and a transverse locking projection elevation. The transverse locking projection apex may be the furthest extent of the transverse locking projection from the dextral side interior surface. The transverse locking gap may be a distance between the transverse locking projection apex to the sinistral side interior surface.

The transverse locking elevation may be measured from an intersection of the central plane and the conduit engagement portion base interior surface. The transverse locking elevation measurement may be taken through the central axis to a line constructed perpendicular to the central plane that intersects the transverse locking projection apex.

In one embodiment of the instant invention, the conduit may be forcibly inserted into the conduit engagement portion by exerting a pressure on the conduit exterior surface to force the conduit into contact with, and then past, the transverse locking projection apex. Alternatively, as one skilled in the art will observe and appreciate, the conduit may be inserted into the conduit engagement portion by first inserting the conduit leading edge past the conduit engagement portion leading edge and then by rotating the conduit, or the body, with the longitudinal locking projection residing within the helical groove.

In another embodiment of the instant invention, the conduit engagement portion has a C-shape, such that in one embodiment of the instant invention, the arc angle is greater than approximately 180 degrees, and the conduit engagement portion interior width may be measured through the central axis from one side of the conduit engagement portion base interior surface to the other.

In yet another embodiment of the instant invention, the conduit engagement portion sinistral side has a sinistral side interior surface transition where the sinistral side interior surface and the conduit engagement portion base interior surface intersect. Similarly, the conduit engagement portion dextral side has a dextral side interior surface transition where the dextral side interior surface and the conduit engagement portion base interior surface intersect. The transverse locking feature may be formed by the sinistral side interior surface transition cooperating with the dextral side interior surface transition. The transverse locking gap may be the distance between the sinistral side interior surface transition and the dextral side interior surface transition.

In another embodiment of the instant invention, the conduit may be inserted into the conduit engagement portion by applying pressure to the conduit exterior surface, forcing the conduit through the transverse locking gap. The transverse locking feature may prevent unintentional withdrawal of the conduit in a direction substantially perpendicular to the central axis. The longitudinal locking projection may prevent unintentional withdrawal of the conduit in a direction substantially parallel to the central axis.

The system of the instant invention enables a significant advance in the state of the art. The instant invention is, in addition, widely applicable to a large number of applications. The various embodiments, as would be understood by one skilled in the art, would be suitable to any application requiring the joining of conduit to electrical junction boxes of various types. These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The clip-on electrical conduit connector (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the present embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
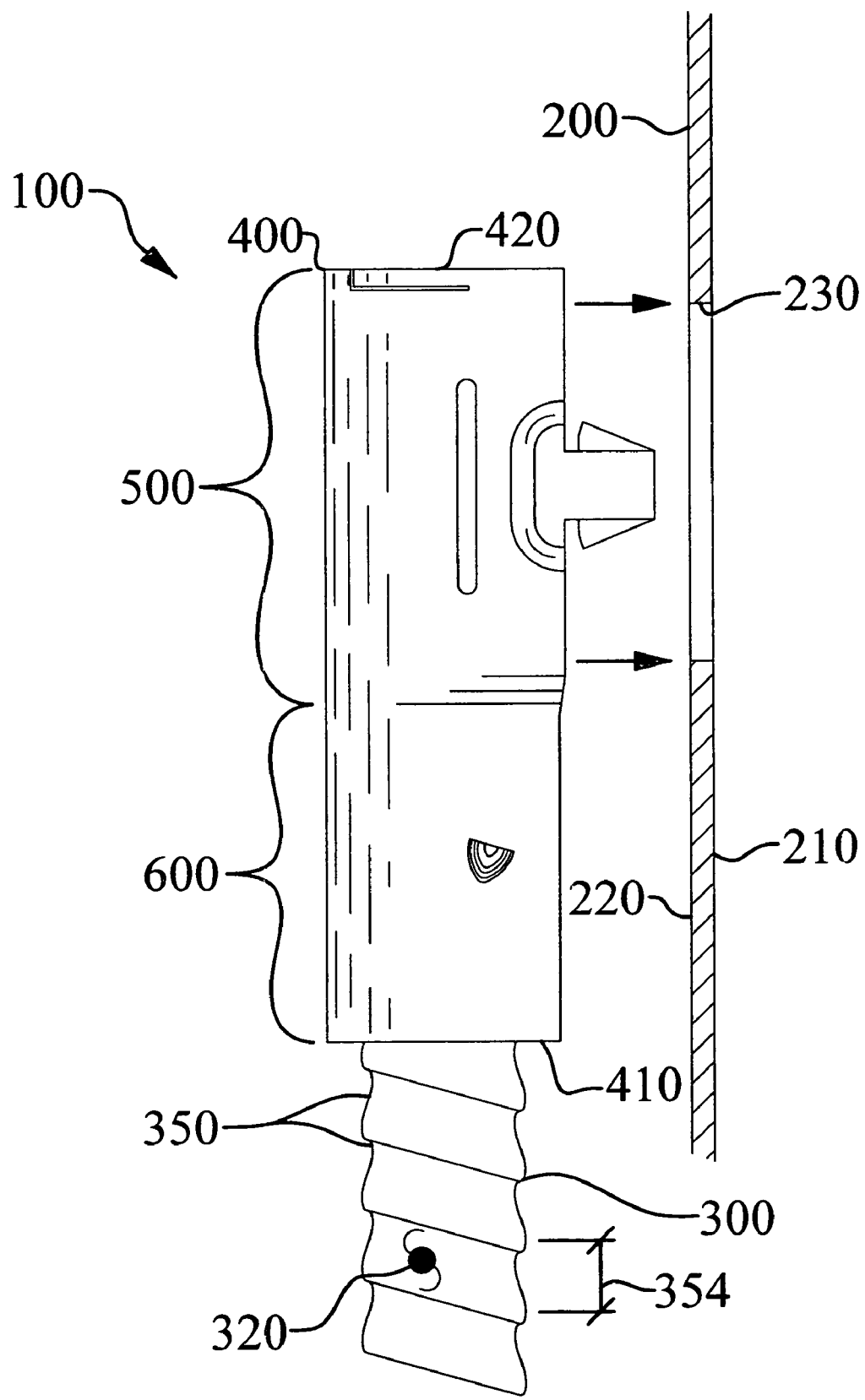
FIG. 1 is an elevation view of an embodiment of the clip-on electrical conduit connector, not to scale.
Figure 10:
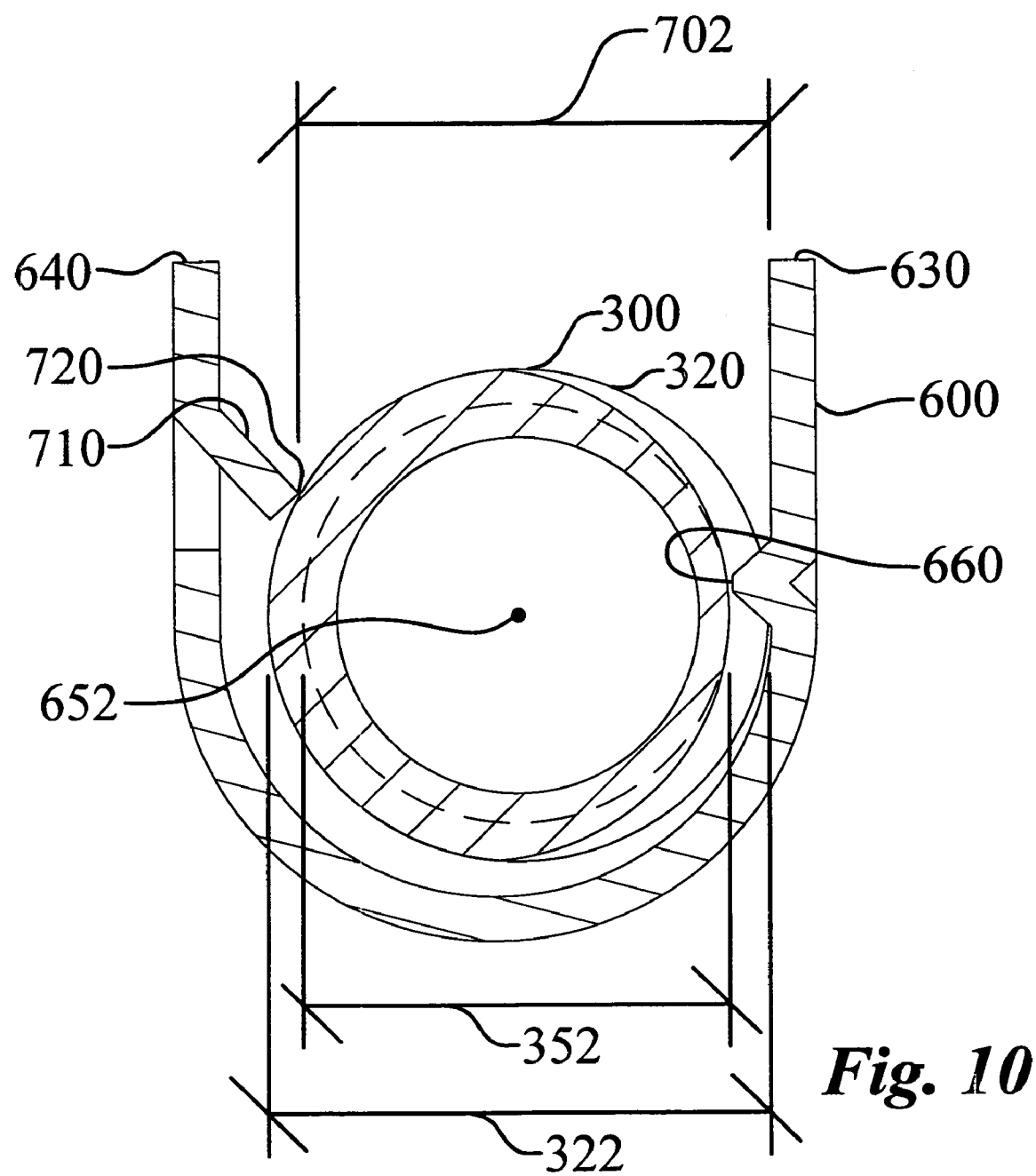
FIG. 10 is a cross-sectional view of an embodiment of the clip-on electrical conduit connector, taken along section line 3—3 in FIG. 2, illustrating a final position of the conduit inserted from the transverse direction, not to scale.
Figure 14:
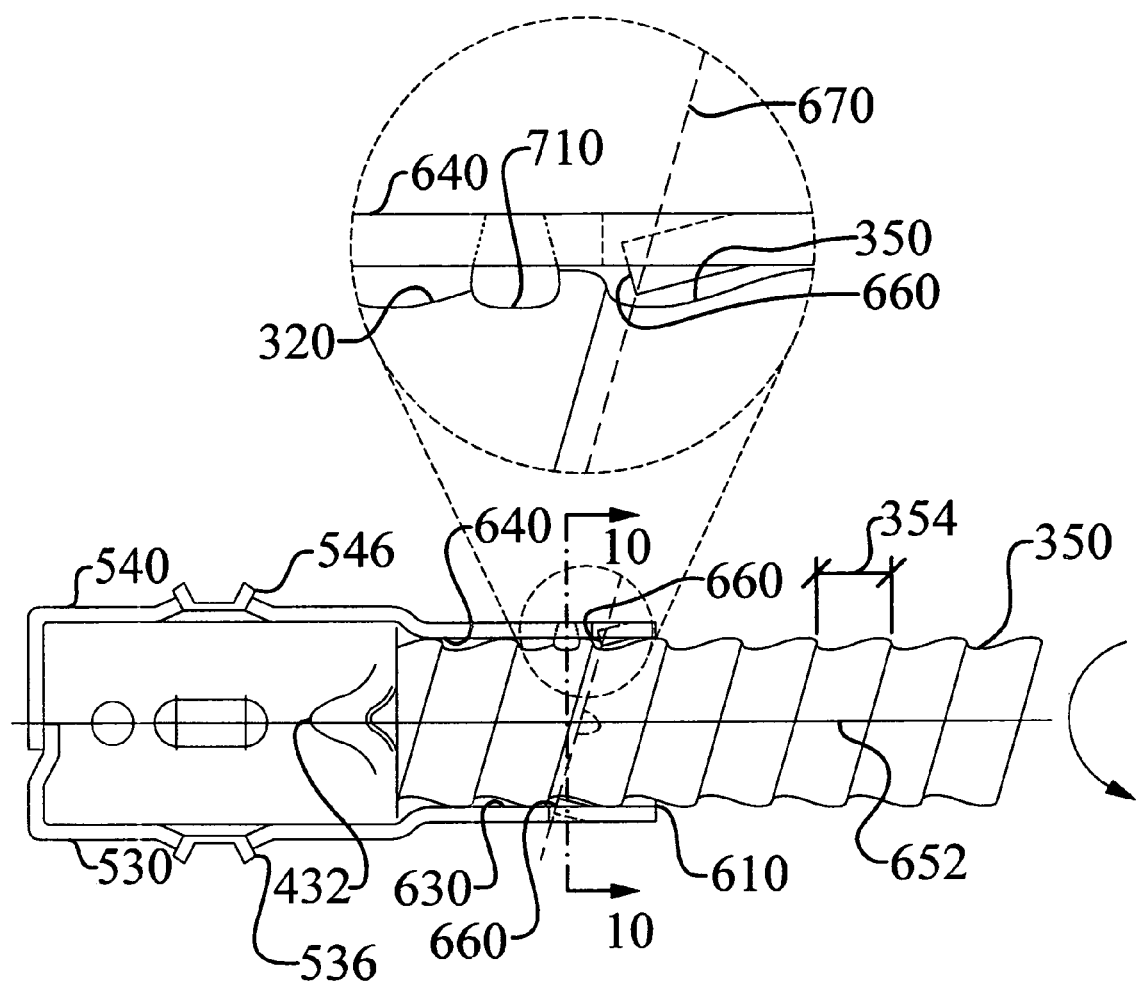
FIG. 14 is a plan view of an embodiment of the clip-on electrical conduit connector, with an enlarged plan view illustrating insertion of the conduit by threading the conduit leading edge into the clip-on electrical conduit connector, not to scale.

A clip-on electrical conduit connector (100), as seen in FIG. 1, accepts and releasably captures, or clips on, a conduit (300). During installation, the connector (100) releasably connects to a junction box (200). The instant invention is equally successful in connecting a plurality of types of conduits (300), such as rigid conduit, flexible metal conduit, armored cable, and metallic cable to a wide variety of boxes (200). Therefore, as used in this specification, the term conduit is not limited to standard flexible conduit, but shall be intended to mean any type of rigid or flexible conduit, including flexible metal conduit (FMC), armored cable (Type AC), metal clad cable (Type MC), or any other type of electrical conductor having interlocking armor strip. Generally, the armor strip is corrosion-resistant steel or aluminum. However, the conduit (300) may be made from steel, plastic, or other commercially feasible and acceptable material. In the illustrated embodiments, the conduit (300) has a conduit exterior surface (320) having a conduit outside diameter (322), a conduit leading edge (340), a helical groove (350) formed by an overlap in the interlocking armor, and a helical groove repeat distance (354) between one overlap and the next overlap in the interlocking armor, as seen in FIGS. 1 and 14. The helical groove (350) has a helical groove outside diameter (352) which may be smaller than the conduit outside diameter (322), as seen in FIG. 10.

The junction box (200) is one of many types of electrical enclosures, such as, outlet and fixture boxes, enclosures for disconnect switches and motor starters, and transformer enclosures. The junction box (200) may be made from steel, plastic, or other commercially feasible and acceptable materials. Referring to FIG. 1, the junction box (200) has a box interior surface (210) and a box exterior surface (220). Typically, the junction box (200) has a plurality of prefabricated holes each of which is covered with a plate or is formed with a thin area in the junction box (200), commonly called a knockout (230). To insert a connector to the junction box (200), the knockout (230) must be exposed by knocking out the cover piece or perforating the thin area. Alternatively, some junction boxes (200) do not have removable covers or thin areas that can be prepped to receive a connector. In this situation, knockouts (230) are cut in the desired location with a punch and die set.

As one skilled in the art will observe and appreciate, by way of example and not limitation, the connector (100) may be stamped from a unitary piece of metal or plastic. Alternatively, the connector (100) may be cast, press formed, or injection molded as a single part, or the connector (100) may be constructed from multiple parts. The individual parts may be soldered or welded together.

With continued reference to FIG. 1, the connector (100) has a body (400). The body (400) has a distal end (410), a proximal end (420), a body interior surface (430), and a body exterior surface (440). The body (400) also has a box engagement portion (500), a conduit engagement portion (600), and a central plane (450). The box engagement portion (500) releasably connects the body (400) to the junction box (200) while the conduit engagement portion (600) releasably captures the conduit (300). The central plane (450) extends longitudinally through the box engagement portion (500) and the conduit engagement portion (600) and is oriented substantially perpendicular to the box exterior surface (220). The conduit engagement portion (600) may keep the conduit (300) within the conduit engagement portion (600) so that the conduit (300) and the connector (100) remain connected during transportation from one location to another. Thus, the conduit engagement portion (600) inhibits the unintentional separation of the conduit (300) from the connector (100). The box engagement portion (500) and the conduit engagement portion (600) will now be briefly described.

Figure 2:
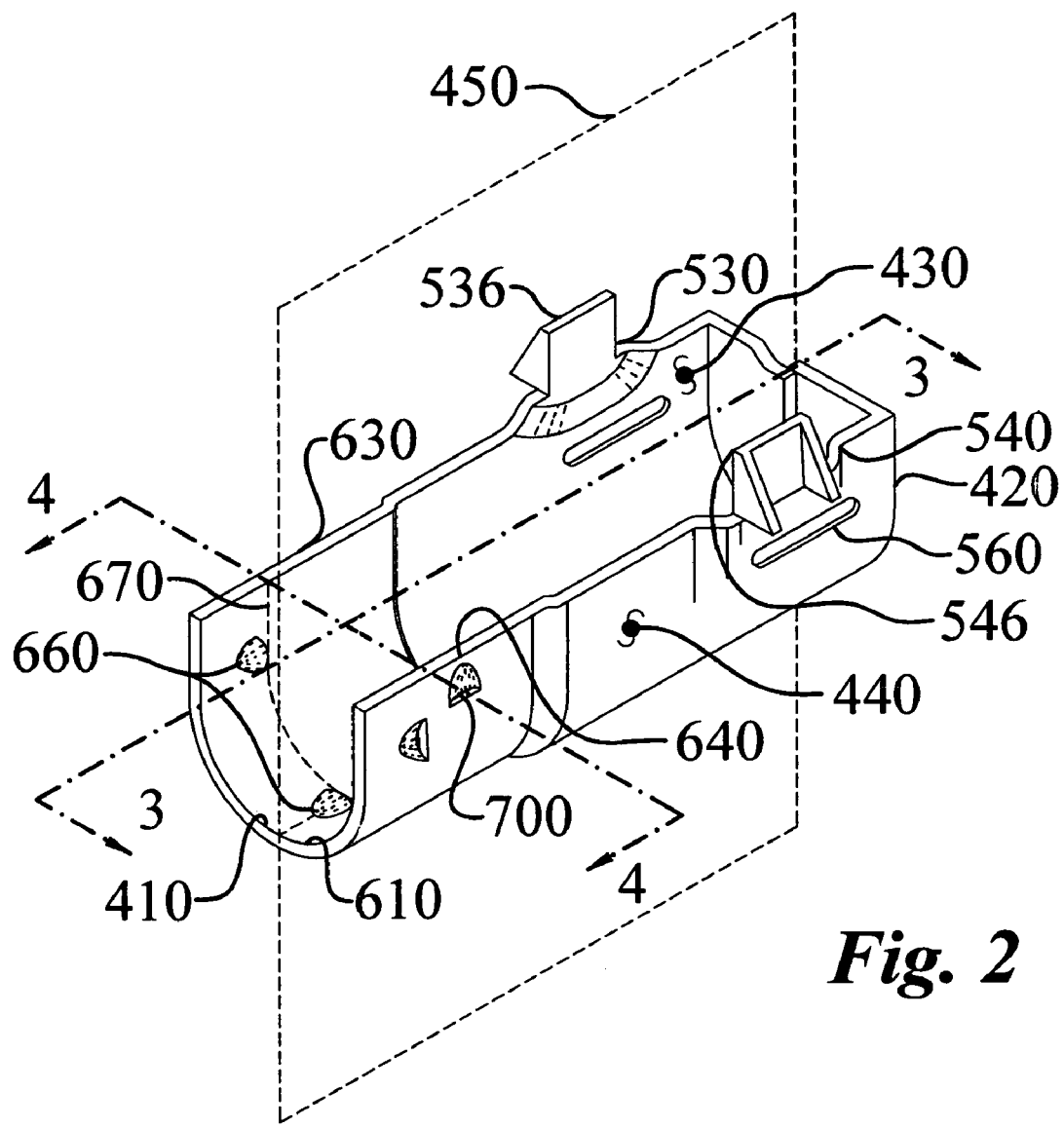
FIG. 2 is an isometric view of an embodiment of the clip-on electrical conduit connector, not to scale.
Figure 3:
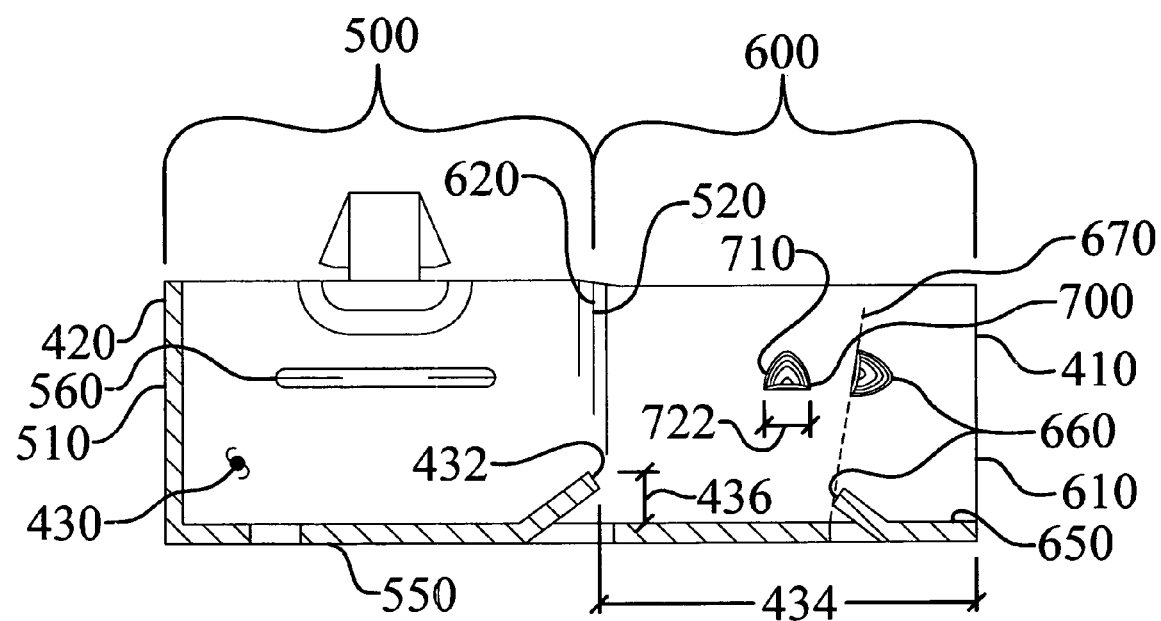
FIG. 3 is a cross-sectional view of an embodiment of the clip-on electrical conduit connector, taken along section line 3—3 in FIG. 2, not to scale.

In an embodiment of the instant invention, as seen in FIGS. 2 and 3, the box engagement portion (500) may have a box engagement portion primary end (510), a box engagement portion secondary end (520), a box engagement portion sinistral side (530), a box engagement portion dextral side (540), and a grip enhancing feature (560), as seen in FIG. 2. The box engagement portion sinistral side (530) and dextral side (540) are joined to a box engagement portion base (550). The box engagement portion (500) has a sinistral attachment prong (536) and a dextral attachment prong (546). The sinistral and dextral attachment prongs (536, 546) may be inserted into the knockout (230), as seen in FIG. 1, to releasably attach the connector (100) to the junction box (200).

The sinistral attachment prong (536) may be located between the box engagement portion primary end (510) and the box engagement portion secondary end (520), best seen in FIG. 2. Similarly, the dextral attachment prong (546) may be located between the box engagement portion primary end (510) and the box engagement portion secondary end (520). In an embodiment of the connector (100), as seen in FIG. 2, the box engagement portion (500) is substantially symmetrical across the central plane (450). However, one skilled in the art will observe and appreciate that a nonsymmetrical box engagement portion (500) may be utilized with similar functionality as the embodiment seen in FIG. 2.

Figure 6:
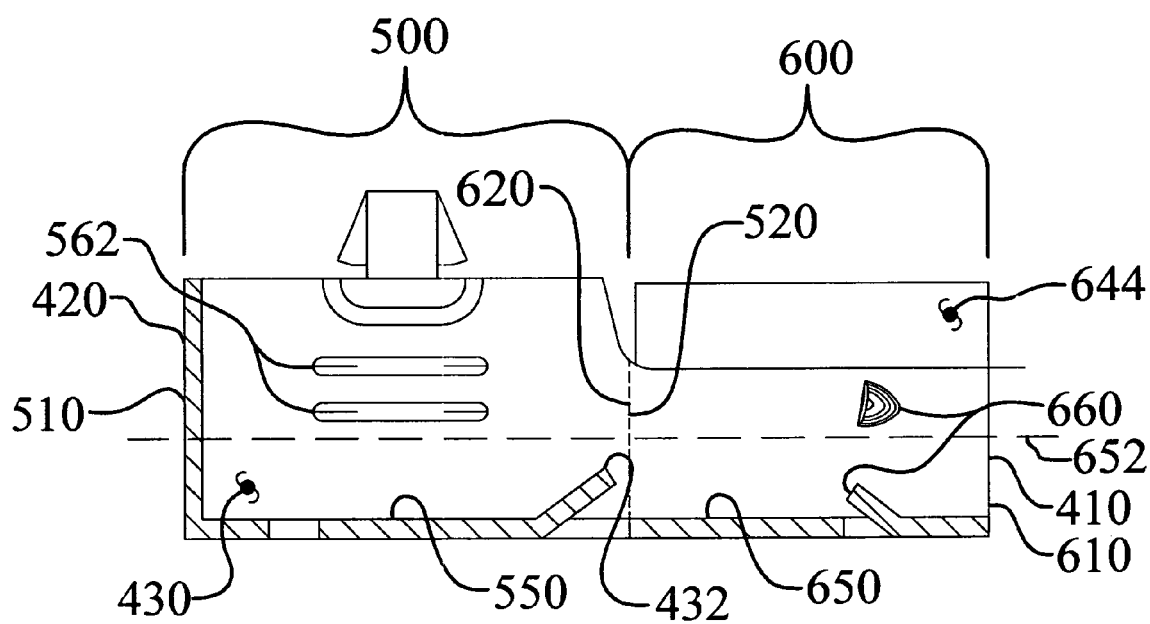
FIG. 6 is a cross-sectional view of an embodiment of the clip-on electrical conduit connector, taken along section line 6—6 in FIG. 5, not to scale.

In another embodiment of the instant invention, the grip enhancing feature (560), seen best in FIG. 2, is located on the body exterior surface (440). The grip enhancing feature (560) may be positioned in proximity to each of the sinistral and dextral attachment prongs (536, 546). As seen in FIG. 2, by way of example and not limitation, the grip enhancing feature (560) is a grip enhancing projection (562) consisting of a rib or protruding feature formed into the body (400). In this embodiment of the grip enhancing feature (560), the electrician may use a tool, possibly a pair of pliers, to place the grip enhancing feature (560) in a pincer grip which may allow the electrician to more easily insert the sinistral and dextral attachment prongs (536, 546) into the knockout (230). As one skilled in the art will appreciate, the box engagement portion (500) may be slightly compressed to allow the sinistral and dextral attachment prongs (536, 546) to fit within the knockout (230). The grip enhancing feature (560) may enable the electrician to firmly grasp, and squeeze, the box engagement portion (500) more easily to complete the final installation. Additionally, other embodiments of the grip enhancing feature (560) are possible. In another embodiment, the grip enhancing feature (560) may be knurled or roughened areas along the body exterior surface (440) which facilitates gripping the body (400) with fingers or with tools. In another embodiment of the instant invention, the grip enhancing projection (562) may be a single rib placed on the body exterior surface (440) or may be more than one rib formed on one or both sides of the body exterior surface (440), as seen in FIG. 6.

Figure 5:
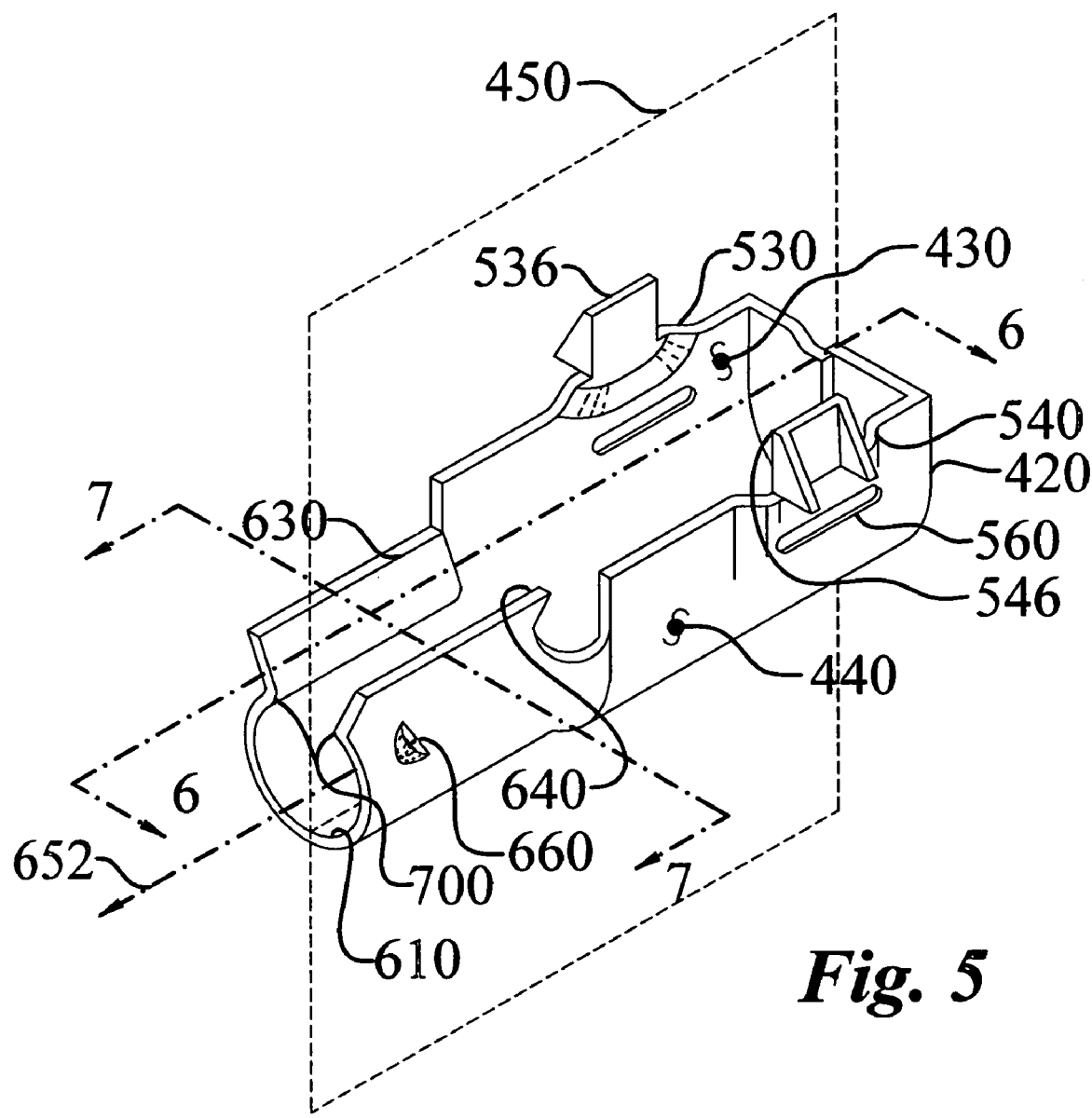
FIG. 5 is an isometric view of an embodiment of the clip-on electrical conduit connector, not to scale.

In another embodiment of the instant invention, as seen in FIGS. 2 and 5, the box engagement portion (500) has a sinistral closure member (532) located on the proximal end (420) of the box engagement portion sinistral side (530). The sinistral closure member (532) may be folded about a sinistral fold line (534) thus partially closing the body proximal end (420). Similarly, the box engagement portion (500) has a dextral closure member (542) located on the proximal end (420) of the box engagement potion dextral side (540). The dextral closure member (542) may be folded about a dextral fold line (544). Thus, when combined with the sinistral closure member (532), the dextral closure member (542) substantially encloses the body proximal end (420). The dextral closure member (542) and the sinistral closure member (532) may help protect any electrical conductors that extend from the conduit (300) through the box engagement portion (500) and into the junction box (200).

As previously mentioned, the conduit engagement portion (600) may releasably capture the conduit (300) within the body (400) and may prevent unintentional disassembly during transport to the final installation location. With continued reference to FIGS. 2 and 3, in one embodiment of the instant invention, the conduit engagement portion (600) has a conduit engagement portion leading edge (610), a conduit engagement portion secondary end (620), a conduit engagement portion sinistral side (630), a conduit engagement portion dextral side (640), a conduit engagement portion base (650), a longitudinal locking projection (660), and a transverse locking feature (700).

Figure 4A:
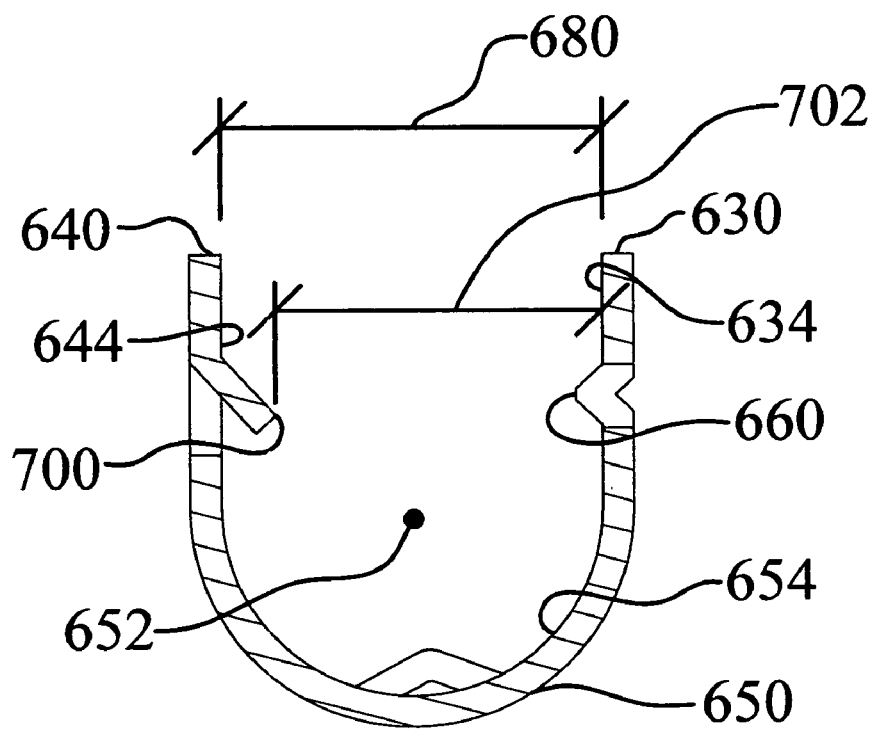
FIG. 4A is a cross-sectional view of an embodiment of the clip-on electrical conduit connector, taken along section line 4—4 in FIG. 2, not to scale.

With reference to an embodiment of the instant invention as seen in FIG. 2 in conjunction with FIG. 4A, a generally U-shaped connector (100) having a generally U-shaped box engagement portion (500) and a generally U-shaped conduit engagement portion (600) may be formed with the conduit engagement portion sinistral side (630) connected to the conduit engagement portion base (650). Similarly, the conduit engagement portion dextral side (640) may be connected to the conduit engagement portion base (650). Thus, the sinistral and dextral sides (630, 640) together with the conduit engagement portion base (650) form the U-shape conduit engagement portion (600), as seen in FIGS. 2 and 4A. With specific reference to FIG. 4A, the conduit engagement portion sinistral side (630) has a sinistral side interior surface (634), the conduit engagement portion dextral side (640) has a dextral side interior surface (644), and the conduit engagement portion base (650) has a conduit engagement portion base interior surface (654). As one skilled in the art will appreciate, the box engagement portion (500) and the conduit engagement portion (600) need not form a U-shape. The conduit engagement portion sinistral side (630), dextral side (640), and base (650) may be other simple, or more complex, shapes with manufacturing cost being one determining factor.

Referring now to FIGS. 3 and 4A, the conduit engagement portion base (650) has a central axis (652), best seen in FIG. 4A. The longitudinal locking projection (660) is located between the conduit engagement portion leading edge (610) and the conduit engagement portion secondary end (620), as best seen in FIG. 3. The longitudinal locking projection (660) extends from the body interior surface (430) toward the central axis (652). In the embodiment of the instant invention seen in FIG. 3 the longitudinal locking projection (660) is formed from the body (400) by using a tool to perforate and form a discontinuity in the body interior and exterior surfaces (430, 440). The material displaced during the perforation is pushed toward the central axis (652) to form the longitudinal locking projection (660). As one skilled in the art will observe and appreciate, the longitudinal locking projection (660) may be formed by many other means. By way of example, the longitudinal locking projection (660) may be formed by placing other materials onto the body interior surface (430), such as solder, or by connecting additional parts to the body (400).

With continued reference to FIGS. 3, and 4A, in one embodiment of the instant invention, the transverse locking feature (700) is on the body interior surface (430) between the conduit engagement portion secondary end (620) and the conduit engagement portion leading edge (610). While FIGS. 3 and 4A show the transverse locking feature (700) on the conduit engagement portion dextral side (640), one skilled in the art will appreciate that the transverse locking feature (700) may be located on the sinistral side (630).

Referring now to FIG. 4A, a transverse locking gap (702) may be the distance between the furthest projection of the transverse locking feature (700) from the dextral side interior surface (644) to the sinistral side interior surface (634). As one skilled in the art will observe and appreciate, the transverse locking gap (702) may be less than the conduit outside diameter (322) to releasably capture the conduit (300) in the conduit engagement portion (600).

In one embodiment of the instant invention, seen most clearly in FIG. 3, the box engagement portion (500) includes a conduit stop (432) formed on the body interior surface (430). The conduit stop (432) may prevent the conduit leading edge (340) from being inserted into the box engagement portion (500), best seen in FIG. 14. As with the longitudinal locking projection (660), the conduit stop (432) may be formed by using a tool to perforate the body interior and exterior surfaces (430, 440) and displacing the material adjacent to the perforation toward the central axis (652). As one skilled in the art will observe and appreciate, other methods of forming the conduit stop (432) exist. By way of example, and not limitation, a screw or rivet may be inserted through the body (400) to project toward the central axis (652). Again, like the longitudinal locking projection (660), additional materials may be attached to the body interior surface (430), thereby forming an obstacle to objects inserted through the conduit engagement portion (600). In another embodiment, as seen in FIG. 3, the conduit stop (432) has a conduit insertion distance (434) and a conduit stop projection distance (436). The conduit insertion distance (434) may be measured from the distal end (410) to the conduit stop (432), which is measured from the body distal end (410). In one embodiment of the instant invention, the conduit insertion distance (434) measures between one conduit outside diameter (352) and three conduit outside diameters (352) to help ensure substantially sufficient engagement between the conduit (300) and the conduit engagement portion (600). The conduit stop projection distance (436) may be measured from the body interior surface (430) to the furthest projection of the conduit stop (432) from the body interior surface (430). In one embodiment of the instant invention, the conduit stop projection distance (436) may be less than one-quarter of the conduit outside diameter (322), for accepting a range of conduit sizes.

In one embodiment of the instant invention, best seen in FIG. 2, the central plane (450) is used to help describe other portions of the body (400). The central plane (450) may be positioned longitudinally through the box engagement portion (500) and the conduit engagement portion (600). The central plane (450) may be substantially perpendicular to the box exterior surface (220). Finally, the central plane (450) may be approximately equidistant between the box engagement portion sinistral side (530) and the box engagement portion dextral side (540).

Figure 4B:
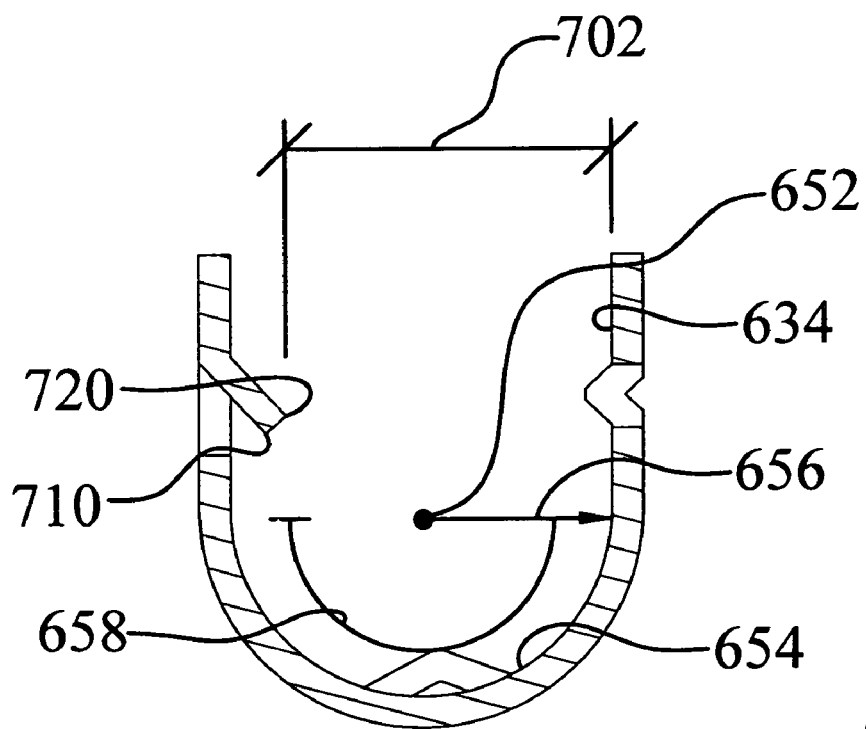
FIG. 4B is a cross-sectional view of an embodiment of the clip-on electrical conduit connector, taken along section line 4—4 in FIG. 2, not to scale.
Figure 4C:
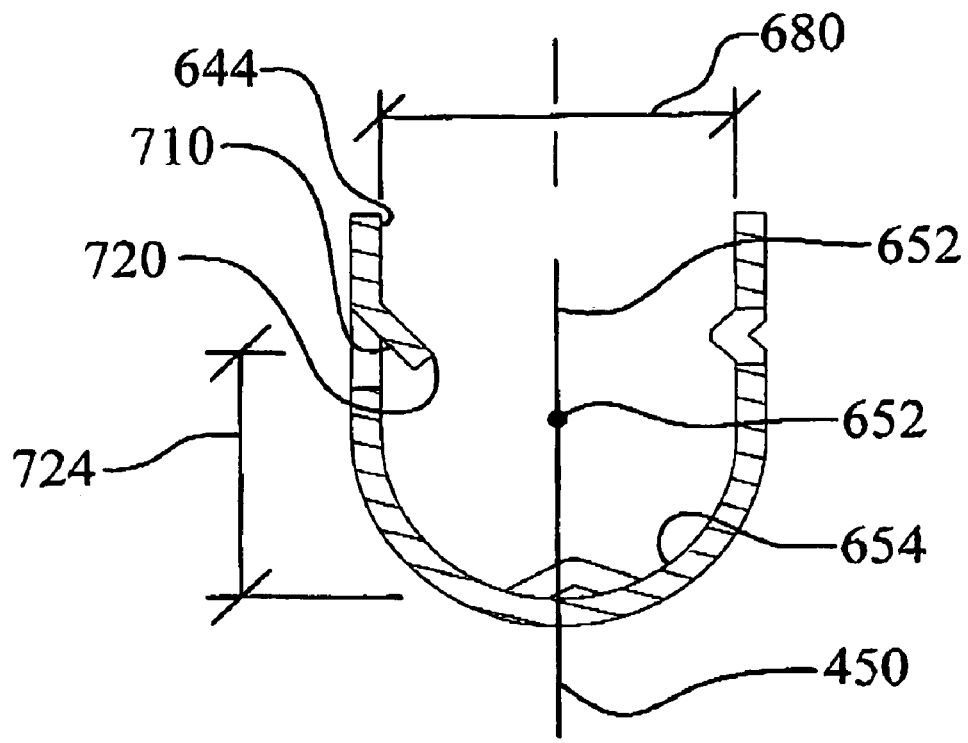
FIG. 4C is a cross-sectional view of an embodiment of the clip-on electrical conduit connector, taken along section line 4—4 in FIG. 2, not to scale.

In one embodiment, as seen in FIGS. 4B and 4C, the central axis (652) is coincident with the central plane (450), and the conduit engagement portion base interior surface (654) is defined by a radius (656) and an arc angle (658). The arc angle (658) extends from where the conduit engagement portion sinistral side (630) meets the conduit engagement portion base (650) to where the conduit engagement portion dextral side (640) meets the conduit engagement portion base (650). The arc angle (658) is approximately 180 degrees, as seen in FIG. 4B. As one skilled in the art will observe and appreciate, in one particular embodiment, the arc angle (658) may be approximately 20 degrees to approximately 180 degrees depending upon the forming process used, and may facilitate the cooperation between the conduit engagement portion base interior surface (654) and the conduit exterior surface (320). In another embodiment, the arc angle (658) may be between approximately 100 degrees and approximately 180 degrees such that the conduit exterior surface (320) and the conduit engagement portion base interior surface (654) have a greater proportion of contact area which may improve the rigidity and durability of the conduit (300) and box engagement portion (600) connection.

Figure 4D:
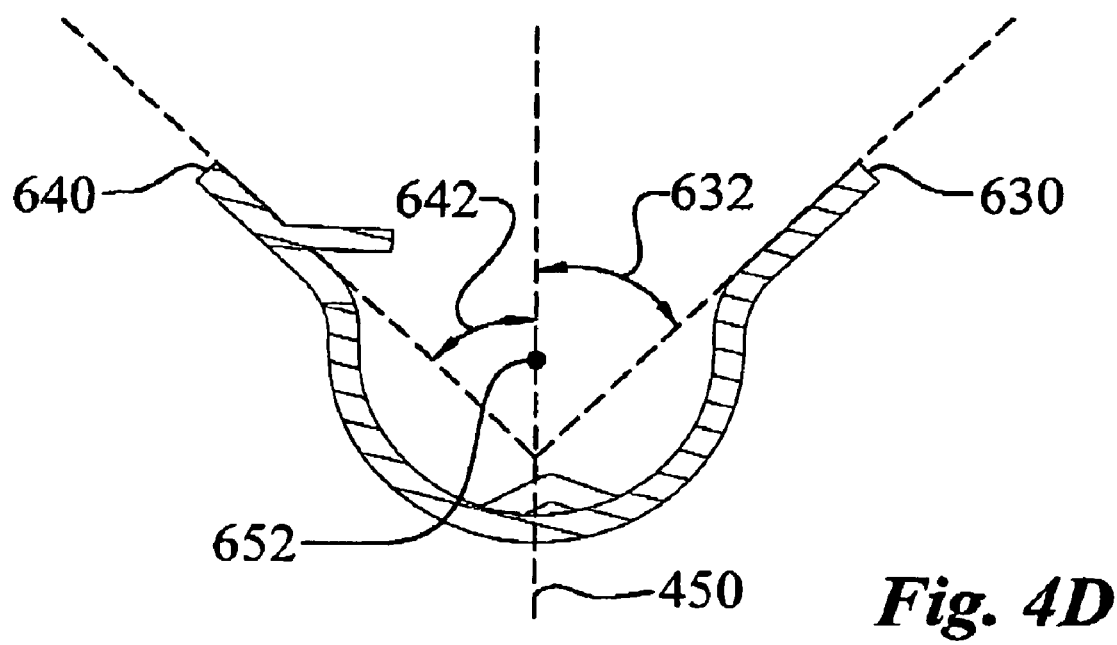
FIG. 4D is a cross-sectional view of an embodiment of the clip-on electrical conduit connector, taken along section line 4—4 in FIG. 2, illustrating an embodiment having a sinistral side lead-in angle and a dextral side lead-in angle, not to scale.

In another embodiment of the instant invention, as seen FIG. 4D, the conduit engagement portion sinistral side (630) may extend in a variety of directions. The conduit engagement portion sinistral side (630) may extend in a direction that is defined by a sinistral side lead-in angle (632). The sinistral side lead-in angle (632) may be measured between the conduit engagement portion sinistral side (630) and the central plane (450). Similarly, the conduit engagement portion sinistral side (640) may extend in a direction that is defined by a dextral side lead-in angle (642). The dextral side lead-in angle (642) may be measured between the conduit engagement portion sinistral side (640) and the central plane (450). In one embodiment, the sinistral side lead-in angle (632) and dextral side lead-in angle (642) are between approximately 0 degrees and approximately 75 degrees. In an embodiment of the instant invention, as seen in FIG. 4C, the sinistral side lead-in angle (632) and the dextral side lead-in angle (642) are approximately 0 degrees. As one skilled in the art will observe and appreciate, the sinistral side and dextral side lead-in angles (632, 642) need not be the same angle. In other words, the conduit engagement portion sinistral side (630) and conduit engagement portion dextral side (640) may extend from the conduit engagement portion base (650) at different angles. As one skilled in the art will appreciate, when the sinistral side lead-in angle (632) or the dextral side lead-in angle (642), is greater than 0 degrees, the conduit engagement portion sinistral side and dextral side (630, 640) may guide the conduit (300) into the conduit engagement portion base (650) perhaps facilitating insertion of the conduit (300) into the conduit engagement portion (600). In addition, the larger the sinistral side and dextral side lead-in angle (632, 642) the greater the number of conduit sizes the conduit engagement portion (600) may cooperate with.

As seen in FIG. 4C, in one embodiment of the instant invention, the conduit engagement portion (600) may have a conduit engagement portion interior width (680). The conduit engagement portion interior width (680) may be the shortest distance between the sinistral side interior surface (634) and the dextral side interior surface (644). As one skilled in the art will appreciate, the conduit engagement portion interior width (680) may be greater than the transverse locking gap (702). Moreover, the conduit engagement portion interior width (680) may be greater than the conduit outside diameter (322). However, as one skilled in the art will observe and appreciate, the conduit engagement portion interior width (680) may be less than the conduit outside diameter (322). Consequently, the conduit engagement portion (600) may expand to more firmly grip the conduit (300) thus holding the conduit (300) within the conduit engagement portion (600). In one embodiment of the instant invention, the conduit engagement portion interior width (680) measures between approximately 0.25 inches and approximately 4 inches.

With continued reference to the embodiment of the instant invention, as seen in FIGS. 4B and 4C, the transverse locking feature (700) is a transverse locking projection (710). The transverse locking projection (710) may be formed in a similar manner as the longitudinal locking projection (660) and the conduit stop (432). As seen in FIG. 4C, the transverse locking projection has a transverse locking projection apex (720) and a transverse locking projection elevation (724). The transverse locking projection apex (720) is the furthest extent of the transverse locking projection (710) from the dextral side interior surface (644). As seen in FIG. 4B, the transverse locking gap (702) may be a distance between the transverse locking projection apex (720) to the sinistral side interior surface (634). In one embodiment of the instant invention, the transverse locking gap (702) is between approximately 5% and approximately 95% of the conduit engagement portion interior width (680) depending on the rigidity of the transverse locking projection (710). As the rigidity of the transverse locking projection (710) increases, the transverse locking gap (702) may be between approximately 5% and approximately 20% of the conduit engagement portion interior width (680). As one skilled in the art will appreciate, the transverse locking projection (710) may be formed on either the conduit engagement portion dextral side (640) or the conduit engagement portion sinistral side (630).

With reference once again to FIG. 4C, the transverse locking elevation (724) may be measured from an intersection of the central plane (450) and the conduit engagement portion base interior surface (654). The measurement of the transverse locking elevation (724) may be taken through the central axis (652) to a line constructed perpendicular to the central plane (450) that intersects the transverse locking projection apex (720). In one particular embodiment, the transverse locking elevation (724) is at least 51% of the conduit engagement portion interior width (680) so that the transverse locking projection (710) may be positioned above the conduit outside diameter (322). In another embodiment, the transverse projection elevation (724) is between approximately 55% and approximately 80% of the conduit engagement portion interior width (680) which may permit a large range of conduit sizes to be inserted into the conduit engagement portion (600), particularly if the conduit outside diameter (322) is larger than the conduit engagement portion interior width (680). As one skilled in the art will observe and appreciate, there may be a relationship between the transverse locking elevation (724), the conduit engagement portion interior width (680), and the transverse locking gap (702). By adjusting these dimensions, one skilled in the art may design the connector (100) to fit a range of conduit outside diameters (322) that may be retained within the conduit engagement portion (600).

Figure 8:
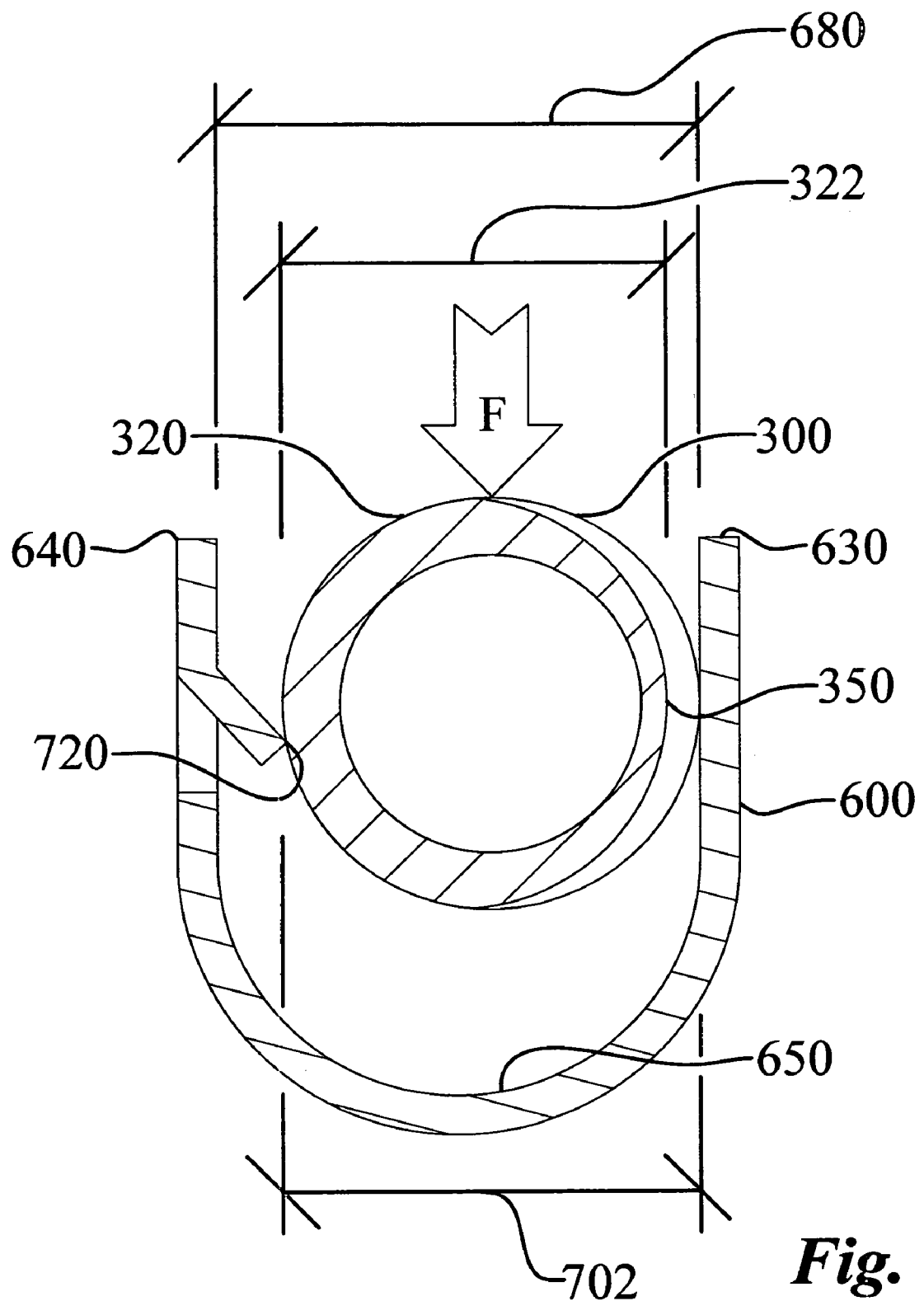
FIG. 8 is a cross-sectional view of an embodiment of the clip-on electrical conduit connector, taken along section line 3—3 in FIG. 2, illustrating a step in the insertion of a conduit from a transverse direction, not to scale.
Figure 9:
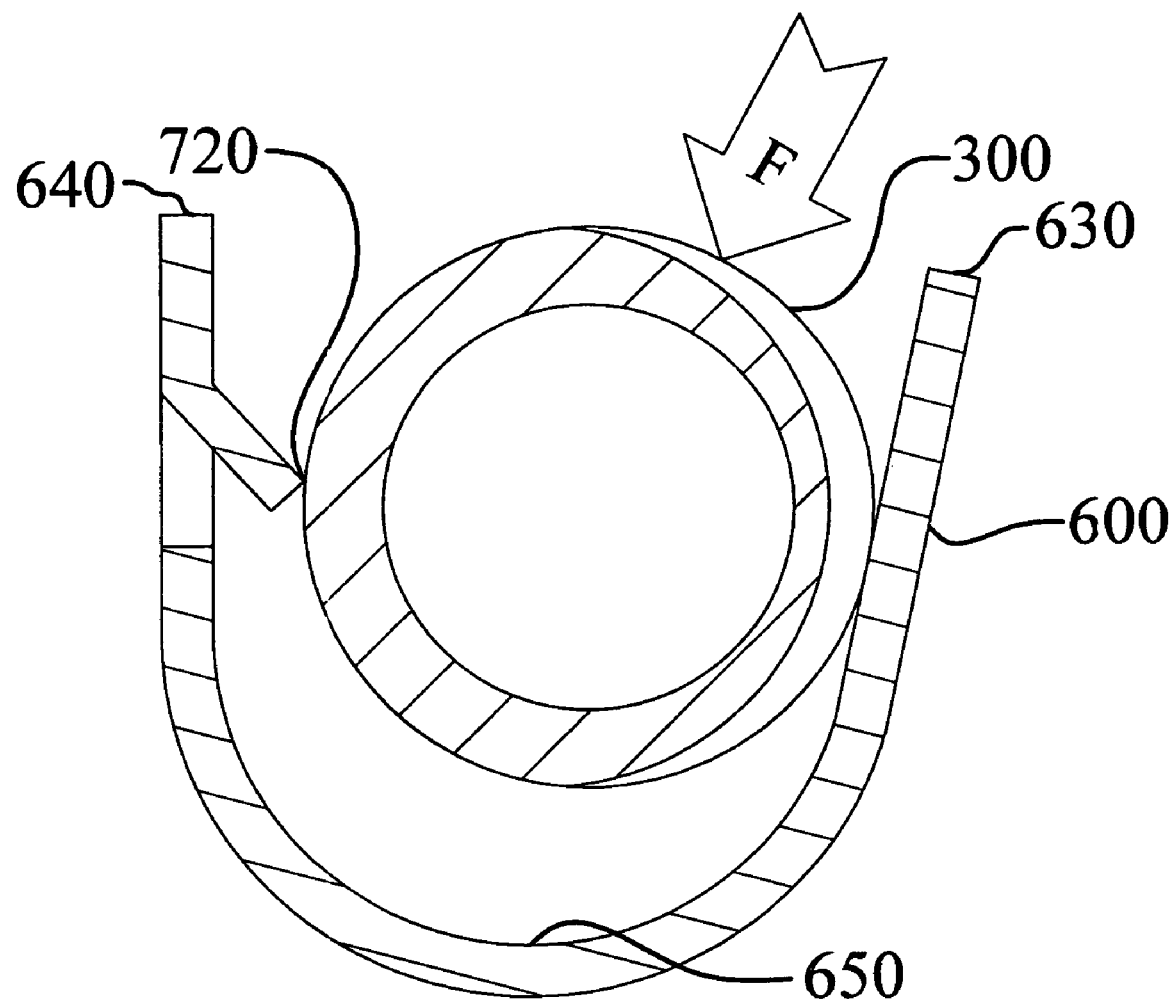
FIG. 9 is a cross-sectional view of an embodiment of the clip-on electrical conduit connector, taken along section line 3—3 in FIG. 2, illustrating yet another step in the insertion of the conduit from the transverse direction, not to scale.

In a cross-sectional view of one embodiment of the instant invention, as seen in FIG. 8, the conduit (300) is forcibly inserted into the conduit engagement portion (600) by exerting a pressure on the conduit exterior surface (320) to force the conduit (300) into contact with the transverse locking projection apex (720). Additional pressure applied to the body (400) causes the body (400) to flex, as seen in FIG. 9, to allow the conduit outside diameter (322) to pass the transverse locking projection apex (720). As seen in FIG. 10, once the conduit (300) passes through the transverse locking gap (702), the conduit (300) may be substantially retained in the conduit engagement portion (600) by the transverse locking projection (710). The transverse locking projection (710) may prevent unintentional withdrawal of the conduit (300) in a direction substantially perpendicular to the central axis (652). As seen in FIG. 14, the longitudinal locking projection (660) prevents unintentional withdrawal in a direction substantially parallel to the central axis (652). The conduit (300) is retained in the connector (100) during transportation to the installation site and while the sinistral attachment prong (536) and the dextral attachment prong (546) are releasably inserted into the knockout (230).

Alternatively, as one skilled in the art will observe and appreciate, as seen in FIG. 14, the conduit (300) may be inserted into the conduit engagement portion (600) by first inserting the conduit leading edge (340) past the conduit engagement portion leading edge (610) and then by rotating the conduit (300) or the body (400) such that the longitudinal locking projection (660) resides within the helical groove (350). With continued rotation, the longitudinal locking projection (660) pushes the conduit leading edge (340) into the conduit engagement portion (600) to the point where the conduit leading edge (340) may contact the conduit stop (432). Furthermore, the conduit (300) may be retained in the conduit engagement portion (600). The transverse locking projection (710) and the longitudinal locking projection (660) prevent unintentional withdrawal of the conduit (300) during transportation and during installation of the connector (100) and conduit (300).

In one embodiment on the instant invention, as seen in FIGS. 2, 3, and 14, the conduit engagement portion (600) may have a helical groove engagement line (670). One or more longitudinal locking projections (660) may be positioned on the helical groove engagement line (670). As seen in FIG. 14, the transverse locking projection (710) may be positioned relative to the helical groove engagement line (670) toward the box engagement portion (500) from the helical groove engagement line (670) by less than the helical groove repeat distance (354). In one embodiment of the instant invention, as seen in FIG. 10, when the longitudinal locking projection (660) is within the helical groove outside diameter (352), the transverse locking projection (710) may be positioned to contact the conduit outside diameter (322). Thus, the transverse locking projection (710) may prevent unintentional withdrawal of the conduit (300) from the conduit engagement portion (600) by contacting the conduit exterior surface (320) at the conduit outside diameter (322). In another embodiment of the instant invention, as seen in FIG. 3, the transverse locking projection (710) may have a width (722), wherein, as one skilled in the art will observe and appreciate, as the width (722) increases, a larger range of helical groove repeat distances (354) may be substantially retained within the conduit engagement portion (600).

In another embodiment of the instant invention, as in FIGS. 5, 6, 7A, and 7B, the conduit engagement portion (600) has a C-shape. As seen in FIGS. 5, 6, 7A, and 7B, in one embodiment of the instant invention, the arc angle (658) is greater than approximately 180 degrees and less than approximately 350 degrees which allows for a large range of compatible conduit sizes to be retained within the conduit engagement portion (600). In another embodiment of the instant invention, the arc angle (658) is greater than approximately 180 degrees and less than approximately 300 degrees for easing attachment of the connector (100) to the conduit (300).

Figure 7A:
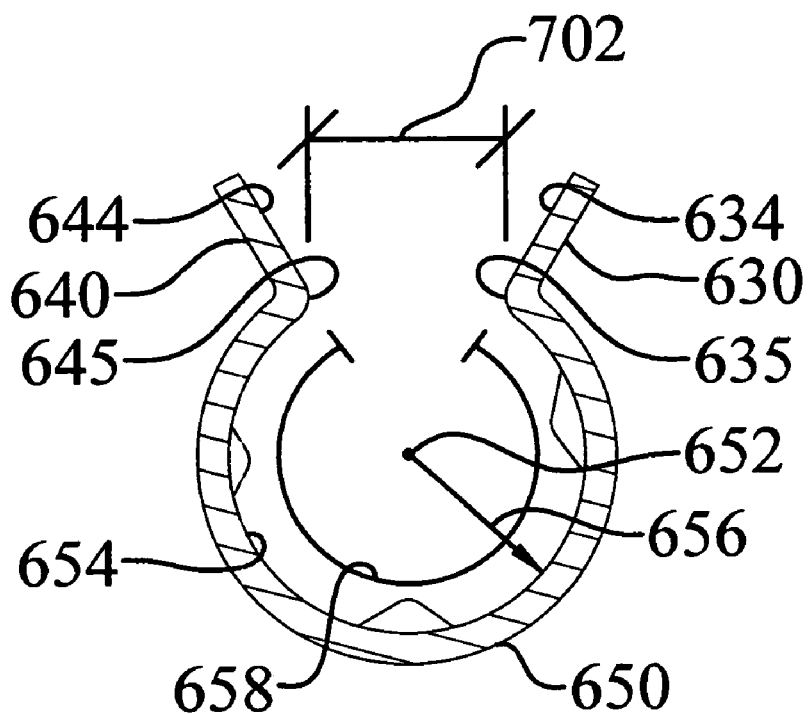
FIG. 7A is a cross-sectional view of an embodiment of the clip-on electrical conduit connector, taken along section line 7—7 in FIG. 5, not to scale.
Figure 7B:
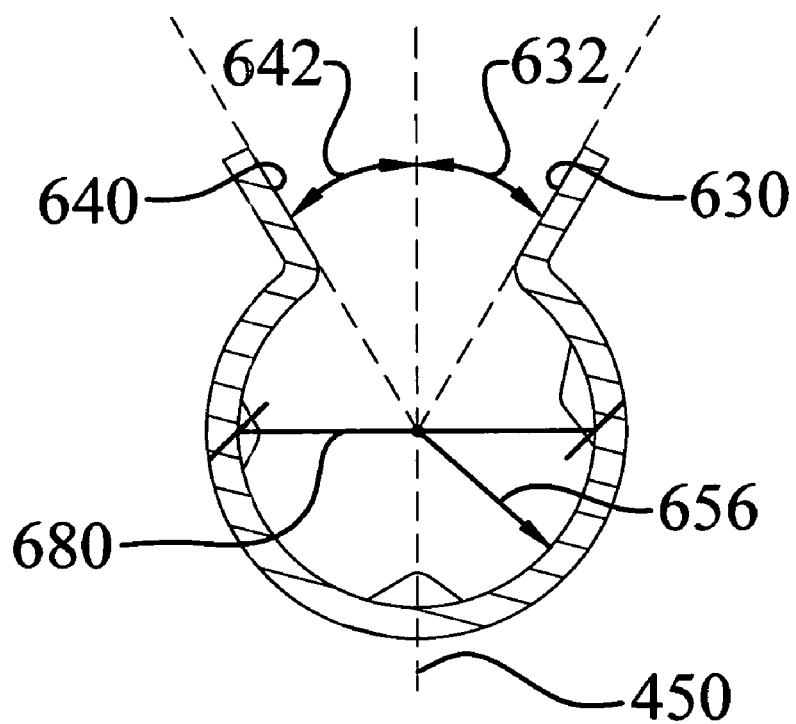
FIG. 7B is a cross-sectional view of an embodiment of the clip-on electrical conduit connector, taken along section line 7—7 in FIG. 5, not to scale.

As seen in FIG. 7B, in another embodiment of the instant invention, the sinistral side lead-in angle (632) may be between approximately 0 degrees and approximately 75 degrees. Similarly, the dextral side lead-in angle (642) may be between approximately 0 degrees and approximately 75 degrees for accepting a large range of conduit sizes. Generally, as the lead-in angle (642) increases the conduit size range compatibility increases. In one particular embodiment of the instant invention, the sinistral side lead-in angle (632) is between approximately 10 degrees and approximately 45 degrees, and the dextral side lead-in angle (642) is between approximately 10 degrees and approximately 45 degrees for balancing ease of installation of the conduit (300) into the connector (100) with a range of compatible conduit sizes.

In this embodiment of the instant invention, as best seen in FIG. 7B, with the arc angle (658) from approximately 180 degrees and less than approximately 350 degrees, the conduit engagement portion interior width (680) may be measured through the central axis (652) from one side of the conduit engagement portion base interior surface (654) to the other. In another embodiment of the instant invention, the conduit engagement portion interior width (680) is approximately 200% of the radius (656) to permit cooperation with commercially available conduit. In one particular embodiment, the radius (656) of the conduit engagement portion base interior surface (654) may be between approximately 0.125 inches and approximately 2 inches.

In yet another embodiment of the instant invention, as seen in FIG. 7A, the conduit engagement portion sinistral side (630) has a sinistral side interior surface transition (635) where the sinistral side interior surface (634) and the conduit engagement portion base interior surface (654) intersect. Similarly, the conduit engagement portion dextral side (640) has a dextral side interior surface transition (645) where the dextral side interior surface (644) and the conduit engagement portion base interior surface (654) intersect. The transverse locking feature (700) may be formed by the sinistral side interior surface transition (635) cooperating with the dextral side interior surface transition (645). As seen in FIG. 7A, the transverse locking gap (702) is the distance between the sinistral side interior surface transition (635) and the dextral side interior surface transition (645). As one skilled in the art will observe and appreciate, the conduit engagement portion interior width (680) may be greater than the transverse locking gap (702). In one particular embodiment, the transverse locking gap (702) is between approximately 5% and approximately 95% of the conduit engagement portion interior width (680) depending on the rigidity of the conduit engagement portion base (650). As the rigidity of the conduit engagement portion base (650) increases, the transverse locking gap (702) may be between approximately 5% and approximately 20% of the conduit engagement portion interior width (680).

Again, a range of conduit sizes may be accommodated by adjusting the characteristics of the connector (100). In one embodiment, adjustments to the conduit engagement portion interior width (680) and the arc angle (658) allows greater conduit outside diameter (322) size range compatibility. By way of example, as the arc angle (658) increases for a given conduit engagement portion interior width (680), the range of conduit outside diameters (322) that may be inserted and substantially retained within the conduit engagement portion (600) increases.

Figure 11:
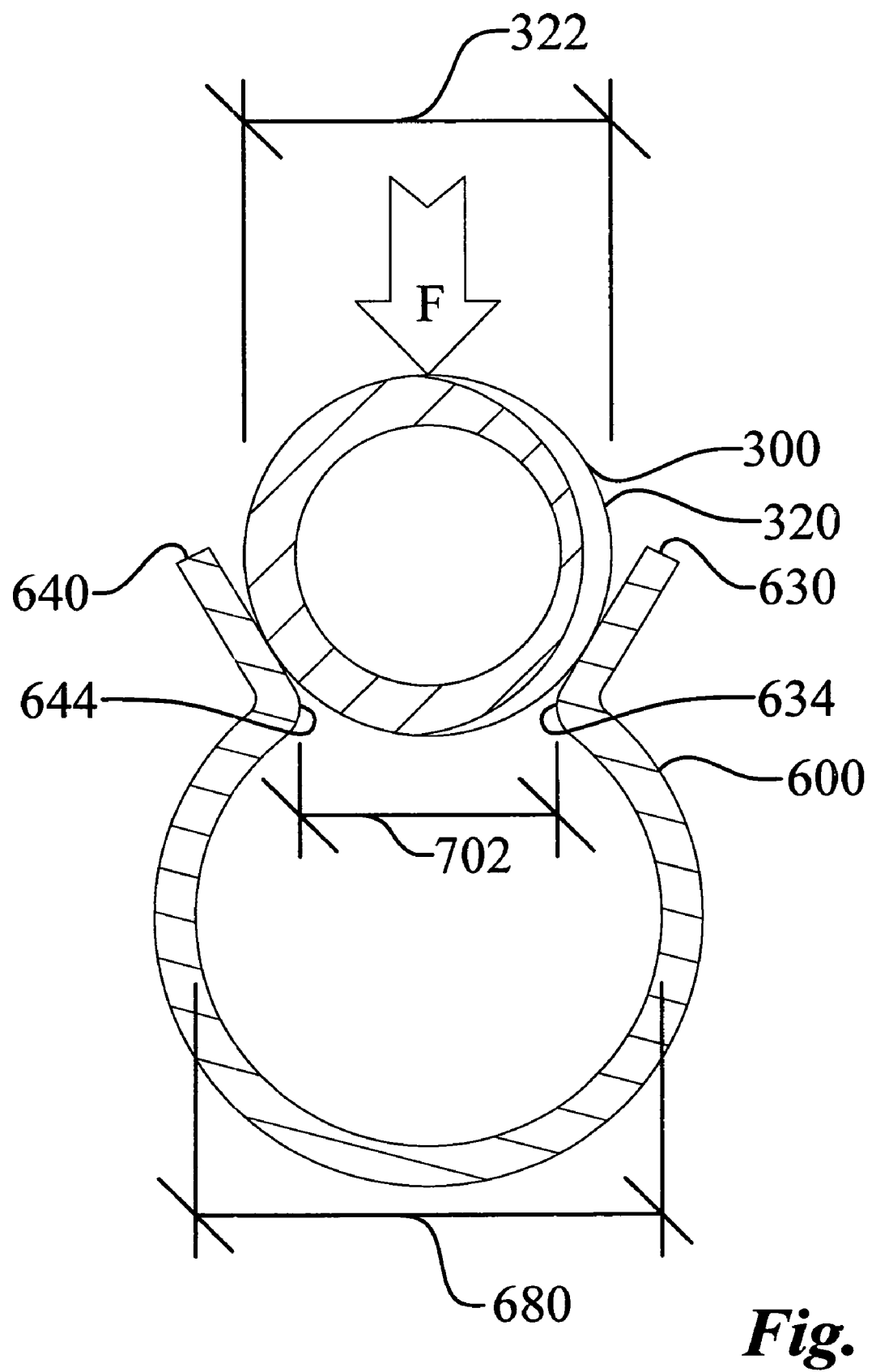
FIG. 11 is a cross-sectional view of an embodiment of the clip-on electrical conduit connector, taken along section line 7—7 in FIG. 5, illustrating a step in the insertion of a conduit from a transverse direction, not to scale.
Figure 12:
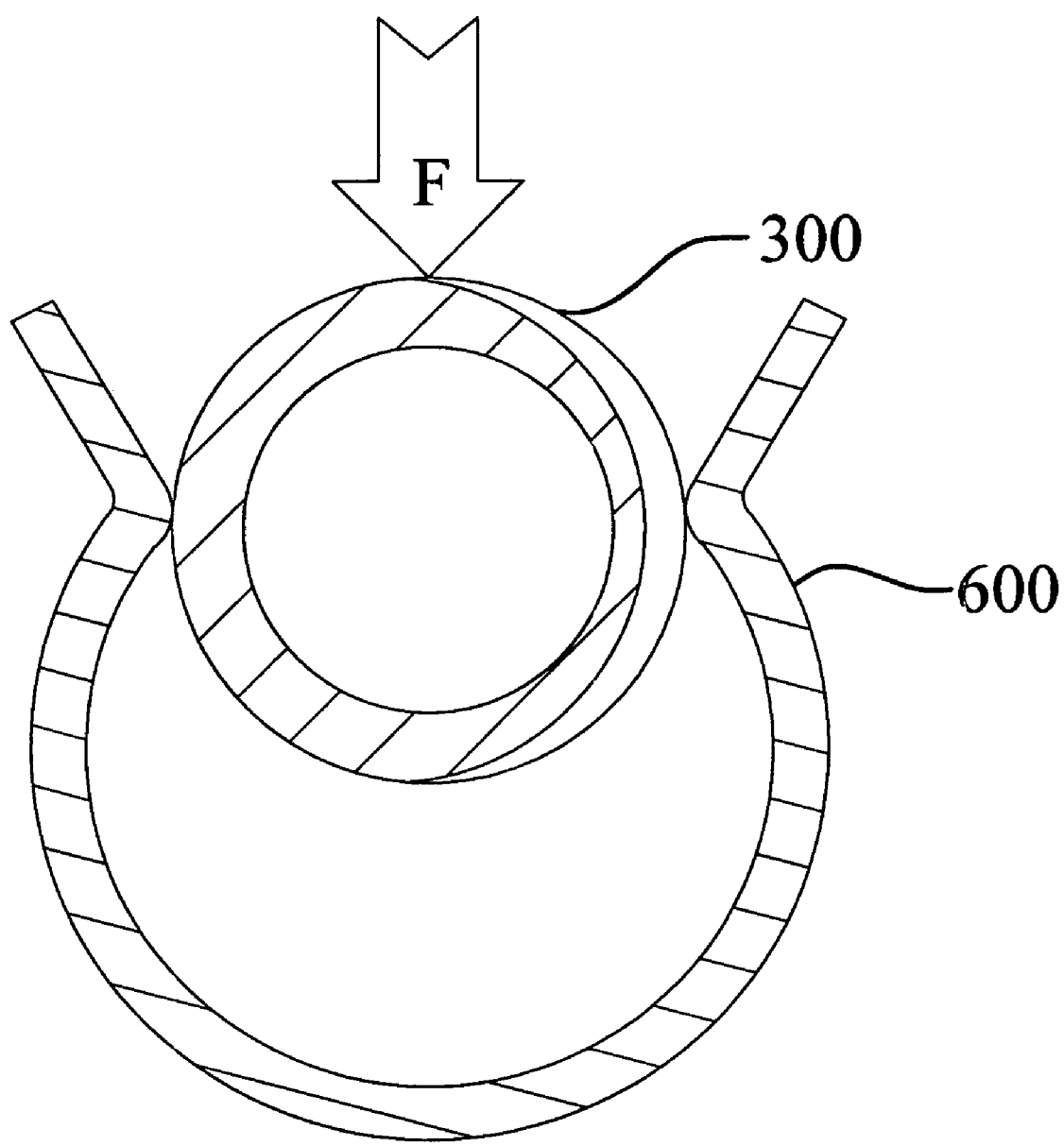
FIG. 12 is a cross-sectional view of an embodiment of the clip-on electrical conduit connector, taken along section line 7—7 in FIG. 5, illustrating yet another step in the insertion of the conduit from the transverse direction, not to scale.
Figure 13:
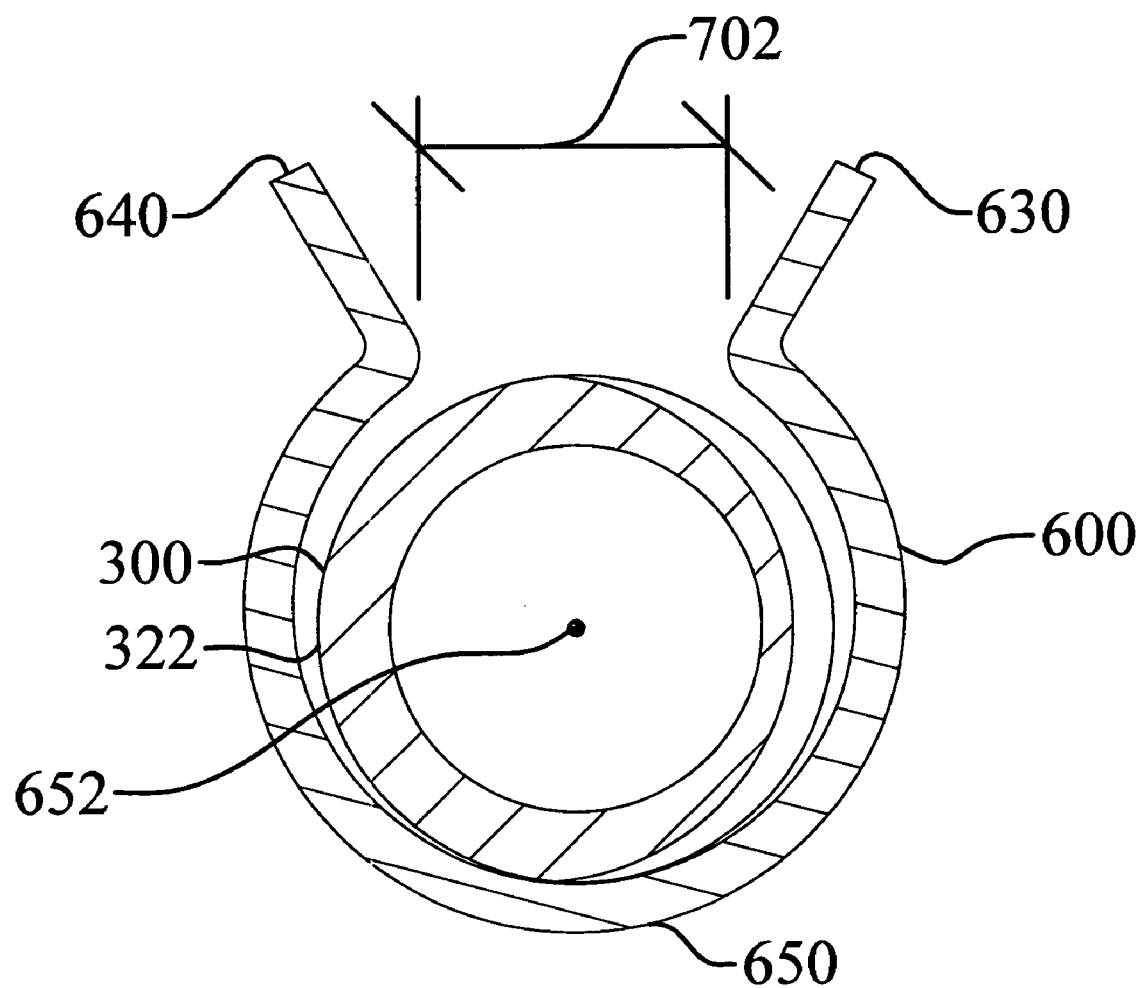
FIG. 13 is a cross-sectional view of an embodiment of the clip-on electrical conduit connector, taken along section line 7—7 in FIG. 5, illustrating a final position of the conduit inserted from the transverse direction, not to scale.

As seen in FIGS. 11, 12, and 13, one method of inserting the conduit (300) into the conduit engagement portion (600) may be to apply pressure to the conduit exterior surface (320) to force the conduit exterior surface (320) into contact with sinistral side interior surface (634) and the dextral side interior surface (644). By applying a greater pressure, the body (400) may flex causing the transverse locking gap (702) to widen, as seen in FIG. 12. Once the transverse locking gap (702) widens enough, the conduit (300) passes through the transverse locking gap (702) and the transverse locking gap (702) narrows as the body's (400) shape substantially returns to the shape the body (400) had prior to inserting the conduit (300), as seen in FIG. 13. Thus, the conduit (300) is substantially retained in the conduit engagement portion (600). The transverse locking feature (700)

prevents unintentional withdrawal of the conduit (300) in a direction substantially perpendicular to the central axis (652). The longitudinal locking projection (660) prevents unintentional withdrawal of the conduit (300) in a direction substantially parallel to the central axis (652). Therefore, the connector (100) and the conduit (300) may be assembled at a remote location and transported to the installation site for insertion of the sinistral attachment prong (536) and the dextral attachment prong (546) into the knockout (230).

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only a few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A clip-on electrical conduit connector (100) for releasably connecting a junction box (200) and a conduit (300), wherein the junction box (200) has a box interior surface (210), a box exterior surface (220), and is formed with a knockout (230) extending from the box interior surface (210) to the box exterior surface (220), and the conduit (300) has a conduit exterior surface (320) defined by a conduit outside diameter (322), a conduit leading edge (340), and is formed with a helical groove (350), comprising:
   a body (400) having a distal end (410), a proximal end (420), a body exterior surface (440), and a body interior surface (430), wherein the body (400) includes a box engagement portion (500) that cooperates with the junction box (200) and a conduit engagement portion (600) that cooperates with the conduit (300); wherein:
   (A) the box engagement portion (500) has a box engagement portion primary end (510), a box engagement portion secondary end (520), a box engagement portion sinistral side (530), a box engagement portion dextral side (540), and a grip enhancing feature (560), and wherein,
   (i) the box engagement sinistral side (530) has a sinistral attachment prong (536), and the sinistral attachment prong (536) is located between the box engagement portion primary end (510) and the box engagement portion secondary end (520);
   (ii) the box engagement dextral side (540) has a dextral attachment prong (546), and the dextral attachment prong (546) is located between the box engagement portion primary end (510) and the box engagement portion secondary end (520); and
   (iii) the grip enhancing feature (560) is located on the body exterior surface (440); and
   (B) the conduit engagement portion (600) has a conduit engagement portion leading edge (610), a conduit engagement portion secondary end (620), a conduit engagement portion sinistral side (630), a conduit engagement portion dextral side (640), a conduit engagement portion base (650), and a transverse locking feature (700), wherein:
   (i) the conduit engagement portion sinistral side (630) is connected to the conduit engagement portion base (650) and the conduit engagement portion sinistral side (630) has a sinistral side interior surface (634);
   (ii) the conduit engagement portion dextral side (640) is connected to the conduit engagement portion base (650) and the conduit engagement portion dextral side (640) has a dextral side interior surface (644); and
   (iii) the transverse locking feature (700) is on the body interior surface (430) between the conduit engagement portion secondary end (620) and the conduit engagement portion leading edge (610) on the conduit engagement portion dextral side (640), and a transverse locking gap (702) is defined by the distance between the furthest projection of the transverse locking feature (700) from the dextral side interior surface (644) to the sinistral side interior surface (634) wherein the transverse locking gap (702) is less than the conduit outside diameter (322); and
   whereby the conduit (300) is forcibly inserted into the conduit engagement portion (600) by forcing the conduit exterior surface (320) into contact with the transverse locking feature (700) which causes the body (400) to flex and permits the conduit (300) to pass through the transverse locking gap (702) such that the conduit (300) is substantially retained in the conduit engagement portion (600), wherein the transverse locking feature (700) prevents unintentional withdrawal of the conduit (300) in a substantially perpendicular direction to the central axis (652), and the sinistral attachment prong (536) and the dextral attachment prong (546) are releasably inserted into the knockout (230) to releasably attach the body (400) to the junction box (200).

2. The clip-on electrical conduit connector (100) of claim 1, wherein the grip enhancing feature (560) is a gripping projection (562).

3. The clip-on electrical conduit connector (100) of claim 1, further including a conduit stop (432) formed on the body interior surface (430), whereby the conduit stop (432) prevents the conduit leading edge (340) from being inserted into the box engagement portion (500).

4. The clip-on electrical conduit connector (100) of claim 1, further including a longitudinal locking projection (660), wherein the conduit engagement portion base (650) has a central axis (652) and the longitudinal locking projection (660) is located between the conduit engagement portion leading edge (610) and the conduit engagement portion secondary end (620), and the longitudinal locking projection (660) extends from the body interior surface (430) toward the central axis (652), whereby the longitudinal locking projection (660) prevents unintentional withdrawal in a direction substantially parallel to the central axis (652).

5. The clip-on electrical conduit connector (100) of claim 1, wherein
   (A) the body (400) has a central plane (450), wherein the central plane (450) is constructed longitudinally through the box engagement portion (500) and the conduit engagement portion (600) such that the central plane (450) is substantially perpendicular to the box exterior surface (220) and the central plane (450) is approximately equidistant between the box engagement portion sinistral side (530) and the box engagement portion dextral side (540);

(B) the conduit engagement portion base (650) has a conduit engagement portion base interior surface (654), wherein the central axis (652) is coincident with the central plane (450), and the conduit engagement portion base interior surface (654) is defined by a radius (656) and an arc angle (658), wherein the and angle (658) is between approximately 20 degrees and approximately 180 degrees;

(C) the conduit engagement portion sinistral side (630) is defined by a sinistral side lead-in angle (632) measured between the conduit engagement portion sinistral side (630) and the central plane (450), wherein the sinistral side lead-in angle (632) is between approximately 0 degrees and approximately 75 degrees;

(D) the conduit engagement portion dextral side (640) is defined by a dextral side lead-in angle (642) measured between the conduit engagement portion dextral side (640) and the central plane (450), wherein the dextral side lead-in angle (642) is between approximately 0 degrees and approximately 75 degrees;

(E) the conduit engagement portion (600) has a conduit engagement portion interior width (680), wherein the conduit engagement portion interior width (680) is the shortest distance between the sinistral side interior surface (634) and the dextral side interior surface (644), and the conduit engagement portion interior width (680) is greater than the transverse locking gap (702);

(F) the transverse locking feature (700) is a transverse locking projection (710) having a transverse locking projection apex (720), a transverse locking projection elevation (724), wherein the transverse locking projection apex (720) is the furthest extent of the transverse locking projection (710) from the dextral side interior surface (644), the transverse locking elevation (724) is measured from an intersection of the central plane (450) and the conduit engagement portion base interior surface (654), through the central axis (652) to a line constructed perpendicular to the central plane (450) that intersects the transverse locking projection apex (720), and the transverse locking elevation (724) is at least 51% of the conduit engagement portion interior width (680); and (G) the transverse locking gap (702) is formed between the transverse locking projection apex (720) to the sinistral side interior surface (634);

whereby the conduit (300) is forcibly inserted into the conduit engagement portion (600) by forcing the conduit exterior surface (320) into contact with the transverse locking projection (710) which causes the body (400) to flex and permits the conduit (300) to pass through the transverse locking gap (702) such that the conduit (300) is substantially retained in the conduit engagement portion (600), wherein the transverse locking projection (710) prevents unintentional withdrawal of the conduit (300) in a direction substantially perpendicular to the central axis (652) while the sinistral attachment prong (536) and the dextral attachment prong (546) are releasably inserted into the knockout (230) to releasably attach the body (400) to the junction box (200).

6. The clip-on electrical conduit connector (100) of claim 5, wherein the arc angle (658) is between approximately 100 degrees and approximately 180 degrees.

7. The clip-on electrical conduit connector (100) of claim 5, wherein the transverse locking gap (702) is between approximately 5% and approximately 95% of the conduit engagement portion interior width (680).

8. The clip-on electrical conduit connector (100) of claim 5, wherein the transverse projection elevation (714) is between approximately 55% and approximately 80% of the conduit engagement portion interior width (680).

9. The clip-on electrical conduit connector (100) of claim 5, wherein the conduit engagement portion interior width (680) measures between approximately 0.25 inches and approximately 4 inches.

10. The clip-on electrical conduit connector (100) of claim 5, further including a conduit stop (432) formed on the body interior surface (430), whereby the conduit leading edge (340) contacts the conduit stop (432) following insertion of the conduit into the conduit engagement portion (600).

11. The clip-on electrical conduit connector (100) of claim 10, wherein the transverse locking projection (710) is positioned on the body interior surface (430) such that the transverse locking projection (710) contacts the conduit outside diameter (322) when the conduit leading edge (340) is in contact with the conduit stop (432).

12. The clip-on electrical conduit connector (100) of claim 5, wherein the conduit helical groove (350) has a helical groove repeat distance (354) measured between adjacent helical grooves (350) and the conduit engagement portion (600) has a longitudinal locking projection (660) and a helical groove engagement line (670) constructed along the interior body surface (430), wherein (A) the helical groove engagement line (670) substantially parallels the helical groove (350) of the conduit (300) when the conduit (300) inserted into the conduit engagement portion (600), (B) the conduit engagement portion base (650) has a central axis (652) and the longitudinal locking projection (660) is located between the conduit engagement portion leading edge (610) and the conduit engagement portion secondary end (620) on the helical groove engagement line (670), and the longitudinal locking projection (660) extends from the body interior surface (430) toward the central as (652), and (C) the transverse locking projection (710) is formed no more than approximately 30% of the helical groove repeat distance (354) longitudinally toward the box engagement portion (500) from the helical groove engagement line (670), whereby the transverse locking projection (710) contacts the conduit exterior surface (320) when the conduit (300) moves substantially perpendicularly to the central axis (652) within the conduit engagement portion (600).

13. The clip-on electrical conduit connector (100) of claim 1, wherein (A) the body (400) has a central plane (450), such that the central plane (450) is constructed longitudinally through the box engagement portion (500) and the conduit engagement portion (600) such that the central plane (450) is substantially perpendicular to the box exterior surface (220) and the central plane (450) is approximately equidistant between the box engagement portion sinistral side (530) and the box engagement portion dextral side (540);

(B) the conduit engagement portion base (650) has a conduit engagement portion base interior surface (654), wherein the central axis (652) is coincident with the central plane (450), and the conduit engagement portion base interior surface (654) is defined by a radius (656) and an arc angle (658), wherein the arc angle (658) is greater than approximately 180 degrees and less than approximately 350 degrees;

(C) the conduit engagement portion sinistral side (630) is defined by a sinistral side lead-in angle (632) measured between the conduit engagement portion sinistral side (630) and the central plane (450), wherein the sinistral side lead-in angle (632) is between approximately 0 degrees and approximately 75 degrees;

(D) the conduit engagement portion dextral side (640) is defined by a dextral side lead-in angle (642) measured between the conduit engagement portion dextral side (640) and the central plane (450), wherein the dextral side lead-in angle (642) is between approximately 0 degrees and approximately 75 degrees;

(E) the conduit engagement portion (600) has a conduit engagement portion interior width (680) measured through the central axis (652) from the conduit engagement portion base interior surface (654), wherein the conduit engagement portion interior width (680) is approximately 200% of the radius (656) and the conduit engagement portion interior width (680) is greater than the transverse locking gap (702);

(F) the conduit engagement portion sinistral side (630) has a sinistral side interior surface transition (635) where the sinistral side interior surface (634) and the conduit engagement portion base interior surface (654) intersect;

(G) the conduit engagement portion dextral side (640) bas a dextral side interior surface transition (645) where the dextral side interior surface (644) and the conduit engagement portion base interior surface (654) intersect;

(H) the transverse locking feature (700) is formed by the sinistral side interior surface transition (635) and the dextral side interior surface transition (645);

(I) the transverse locking gap (702) is the distance between the sinistral side interior surface transition (635) and the dextral side interior surface transition (645), whereby the conduit (300) is forcibly inserted into the conduit engagement portion (600) by forcing the conduit exterior surface (320) into contact with sinistral side interior surface (634) and the dextral side interior surface (644) which causes the body (400) to flex and permits the conduit (300) to pass through the averse locking gap (702) such that the conduit (300) is substantially retained in the conduit engagement portion (600), wherein the transverse locking feature (700) prevents unintentional withdrawal of the conduit (300) in a direction substantially perpendicular to the central axis (652) while the sinistral attachment prong (536) and the dextral attachment prong (546) are releasably inserted into the knockout (230) to releasably attach the body (400) to the junction box (200).

14. The clip-on electrical conduit connector (100) of claim 13, wherein the transverse locking gap (702) is between approximately 5% and approximately 95% of the conduit engagement portion interior width (680).

15. The clip-on electrical conduit connector (100) of claim 13, wherein the arc angle (658) is between approximately 180 degrees and approximately 300 degrees.

16. The clip-on electrical conduit connector (100) of claim 13, wherein the sinistral side lead-in angle (632) is between approximately 10 degrees and approximately 45 degrees, and the dextral side lead-in angle (642) is between approximately 10 degrees and approximately 45 degrees.

17. The clip-on electrical conduit connector (100) of claim 13, wherein the radius (656) of the conduit engagement portion base interior surface (654) is between approximately 0.125 inches and approximately 2 inches.

18. The clip-on electrical conduit connector (100) of claim 13, further including a conduit stop (432) formed on the body interior surface (430), wherein the conduit stop (432) has a conduit stop insertion distance (434) and a conduit stop projection distance (436), whereby the conduit leading edge (340) contacts the conduit stop (432) following insertion of the conduit into the conduit engagement portion (600).

19. A clip-on electrical conduit connector (100) for releasably connecting a junction box (200) and a conduit (300), wherein the junction box (200) has a box interior surface (210), a box exterior surface (220), and is formed with a knockout (230) extending from the box interior surface (210) to the box exterior surface (220), and the conduit (300) has a conduit exterior surface (320) defined by a conduit outside diameter (322), a conduit leading edge (340), and is formed with a helical groove (350), comprising:

a body (400) having a distal end (410), a proximal end (420), a body exterior surface (440), a body interior surface (430), and a central plane (450), wherein the body (400) includes a box engagement portion (500) that cooperates with the junction box (200), a conduit engagement portion (600) that cooperates with the conduit (300), and a conduit stop (432) formed on the body interior surface (430), such that the conduit stop (432) prevents the conduit leading edge (340) from entering the conduit engagement portion (600); wherein:

(A) the box engagement portion (500) has a box engagement portion primary end (510), a box engagement portion secondary end (520), a box engagement portion sinistral side (530), a box engagement portion dextral side (540), and a grip enhancing feature (560), and (i) the central plane (450) is constructed longitudinally through the box engagement portion (500) and the conduit engagement portion (600) such that the central plane (450) is substantially perpendicular to the box exterior surface (220) and the central plane (450) is approximately equidistant between the box engagement portion sinistral side (530) and the box engagement portion dextral side (540);

(ii) the box engagement sinistral side (530) has a sinistral attachment prong (536), and the sinistral attachment prong (536) is located between the box engagement portion primary end (510) and the box engagement portion secondary end (520);

(iii) the box engagement dextral side (540) has a dextral attachment prong (546), and the dextral attachment prong (546) is located between the box engagement portion primary end (510) and the box engagement portion secondary end (520);

(iv) the grip enhancing feature (560) is located on the body exterior surface (440); and (B) the conduit engagement portion (600) has a conduit engagement portion leading edge (610), a conduit engagement portion secondary end (620), a conduit engagement portion sinistral side (630), a conduit engagement portion dextral side (640), a conduit engagement portion base (650), a longitudinal locking projection (660), a conduit engagement portion interior width (680), a transverse locking projection (710), and a transverse locking gap (702) wherein:

(i) the conduit engagement portion sinistral side (630) is connected to the conduit engagement portion base (650) and the conduit engagement portion sinistral side (630) has a sinistral side interior surface (634), wherein the conduit engagement portion sinistral side (630) is defined by a sinistral side lead-in angle (632) measured between the conduit engagement portion sinistral side (630) and the central plane (450), and the sinistral side lead-in angle (632) is between approximately 0 degrees and approximately 75 degrees;

(ii) the conduit engagement portion dextral side (640) is connected to the conduit engagement portion base (650) and the conduit engagement portion dextral side (640) has a dextral side interior surface (644), wherein the conduit engagement portion dextral side (640) is defined by a dextral side lead-in angle (642) measured between the conduit engagement portion dextral side (640) and the central plane (450), and the dextral side lead-in angle (642) is between approximately 0 degrees and approximately 75 degrees;

(iii) the conduit engagement portion base (650) has a central axis (652) and a conduit engagement portion base interior surface (654) defined by a radius (656) and an arc angle (658), wherein the central axis (652) is coincident with the central plane (450) and the arc angle (658) is between approximately 100 degrees and approximately 180 degrees;

(iv) the longitudinal locking projection (660) is located between the conduit engagement portion leading edge (610) and the conduit engagement portion secondary end (620), and the longitudinal locking projection (660) extends from the body interior surface (430) toward the central axis (652);

(v) the conduit engagement portion interior width (680) is the shortest distance between the sinistral side interior surface (634) and the dextral side interior surface (644), the conduit engagement portion interior width (680) is greater than the transverse locking gap (702), and the conduit engagement portion interior width (680) measures between approximately 0.25 inches and approximately 4 inches;

(vi) the transverse locking projection (710) is on the body interior surface (430) between the conduit engagement portion secondary end (620) and the conduit engagement portion leading edge (610) on the conduit engagement portion dextral side (640), and the transverse locking projection (710) has a transverse locking projection apex (720) and a transverse locking projection elevation (724), wherein the transverse locking projection apex (720) is the furthest portion of the transverse locking projection (710) from the dextral side interior surface (644), and the transverse locking elevation (724) is measured from an intersection of the central plane (450) and the conduit engagement portion base interior surface (654), through the central axis (652), to a line constructed perpendicular to the central plane (450) that intersects the transverse locking projection apex (720), wherein the transverse locking elevation (724) is between approximately 55% and approximately 80% of the conduit engagement portion interior width (680); and (vii) the transverse locking gap (702) is the distance between the transverse locking projection apex (720) and the sinistral side interior surface (634), wherein the transverse locking gap (702) is between approximately 5% and approximately 95% of the conduit engagement portion interior width (680);

whereby the conduit (300) is forcibly inserted into the conduit engagement portion (600) by forcing the conduit exterior surface (320) into contact with the transverse locking projection (710) which causes the body (400) to flex and permits the conduit (300) to pass through the transverse locking gap (702) such that the conduit (300) is substantially retained in the conduit engagement portion (600), wherein the transverse locking projection (710) prevents unintentional withdrawal of the conduit (300) in a direction substantially perpendicular to the central axis (652), and wherein the longitudinal locking projection (660) prevents unintentional withdrawal in a direction substantially parallel to the central axis (652), and the sinistral attachment prong (536) and the dextral attachment prong (546) are releasably inserted into the knockout (230) to releasably attach the body (400) to the junction box (200).

20. A clip-on electrical conduit connector (100) for releasably connecting a junction box (200) and a conduit (300), wherein the junction box (200) bas a box interior surface (21), a box exterior surface (220), and is formed with a knockout (230) extending from the box interior surface (210) to the box exterior surface (220), and the conduit (300) has a conduit exterior surface (320) defined by a conduit outside diameter (322), a conduit leading edge (340), and is formed with a helical groove (350), comprising:

a body (400) having a distal end (410), a proximal end (420), a body exterior surface (440), a body interior surface (430), and a central plane (450), wherein the body (400) includes a box engagement portion (500) that cooperates with the junction box (200), a conduit engagement portion (600) that cooperates with the conduit (300), and a conduit stop (432) formed on the body interior surface (430), such that the conduit stop (432) prevents the conduit leading edge (340) from entering the conduit engagement portion (600); wherein:

(A) the box engagement portion (500) has a box engagement portion primary end (510), a box engagement portion secondary end (520), a box engagement portion sinistral side (530), a box engagement portion dextral side (540), and a grip enhancing feature (560), wherein (i) the central plane (450) is constructed longitudinally through the box engagement portion (500) and the conduit engagement portion (600) such that the central plane (450) is substantially perpendicular to the box exterior surface (220) and the central plane (450) is approximately equidistant between the box engagement portion sinistral side (530) and the box engagement portion dextral side (540);

(ii) the box engagement sinistral side (530) has a sinistral attachment prong (536), and the sinistral attachment prong (536) is located between the box engagement portion primary end (510) and the box engagement portion secondary end (520);

(iii) the box engagement dextral side (540) has a dextral attachment prong (546), and the dextral attachment prong (546) is located between the box engagement portion primary end (510) and the box engagement portion secondary end (520); and (iv) the grip enhancing feature (560) is located on the body exterior surface (440); and (B) the conduit engagement portion (600) has a conduit engagement portion leading edge (610), a conduit engagement portion secondary end (620), a conduit engagement portion sinistral side (630), a conduit engagement portion dextral side (640), a conduit engagement portion base (650), a longitudinal locking projection (660), a conduit engagement portion interior width (680), a transverse locking feature (700), and a transverse locking gap (702), wherein (i) the conduit engagement portion sinistral side (630) is connected to the conduit engagement portion base (650), the conduit engagement portion sinistral side (630) has a sinistral side interior surface (634) and a sinistral side interior surface transition (635), and the conduit engagement portion sinistral side (630) is defined by a sinistral side lead-in angle (632), wherein the sinistral side interior surface transition (635) is located where the sinistral side interior surface (634) and the conduit engagement portion base interior surface (654) intersect, the sinistral side lead-in angle (632) is measured between the conduit engagement portion sinistral side (630) and the central plane (450), and the sinistral side lead-in angle (632) is between approximately 10 degrees and approximately 45 degrees, and;

(ii) the conduit engagement portion dextral side (640) is connected to the conduit engagement portion base (650), the conduit engagement portion dextral side (640) has a dextral side interior surface (644) and a dextral side interior surface transition (645), and the conduit engagement portion dextral side (640) is defined by a dextral side lead-in angle (642), wherein the dextral side interior surface transition (645) is located where the dextral side interior surface (644) and the conduit engagement portion base interior surface (654) intersect, and the dextral side lead-in angle (642) is measured between the conduit engagement portion dextral side (640) and the central plane (450), and the dextral side lead-in angle (642) is between approximately 10 degrees and approximately 45 degrees, and;

(iii) the conduit engagement portion base (650) has a central axis (652) and a conduit engagement portion base interior surface (654) defined by a radius (656) and an arc angle (658), wherein the central axis (652) is coincident with the central plane (450), the arc angle (658) is between approximately 180 degrees and approximately 300 degrees, and the radius (656) is between approximately 0.125 inches and approximately 2 inches;

(iv) the longitudinal locking projection (660) is located between the conduit engagement portion leading edge (610) and the conduit engagement portion secondary end (620), and the longitudinal locking projection (660) extends from the body interior surface (430) toward the central axis (652);

(v) the conduit engagement portion interior width (680) is measured through the central axis (652) from the conduit engagement portion base interior surface (654), wherein the conduit engagement portion interior width (680) is approximately 200% of the radius (656), and the conduit engagement portion interior width (680) is greater than the transverse locking gap (702);

(vi) the transverse locking feature (700) is formed by the sinistral side interior surface transition (635) and the dextral side interior surface transition (645); and (vii) the transverse locking gap (702) is the distance between the sinistral side interior surface transition (635) and the dextral side interior surface transition (645), wherein the transverse locking gap (702) is between approximately 5% and approximately 95% of the conduit engagement portion interior width (680);

whereby the conduit (300) is forcibly inserted into the conduit engagement portion (600) by forcing the conduit exterior surface (320) into contact with sinistral side interior surface (634) and the dextral side interior surface (644) which causes the body (400) to flex and permits the conduit (300) to pass through the transverse locking gap (702) such that the conduit (300) is substantially retained in the conduit engagement portion (600), wherein the transverse locking feat (700) prevents unintentional withdrawal of the conduit (300) in a direction substantially perpendicular to the central axis (652), and wherein the longitudinal locking projection (660) prevents unintentional withdrawal of the conduit (300) in a direction substantially parallel to the central axis (652), and the sinistral attachment prong (536) and the dextral attachment prong (546) are releasably inserted into the knockout (230) to releasably attach the body (400) to the junction box (200).

* * * * *